United States Patent
Yajima et al.

(10) Patent No.: US 10,314,293 B2
(45) Date of Patent: Jun. 11, 2019

(54) LIVESTOCK MANAGEMENT SYSTEM, SENSOR APPARATUS, AND ESTIMATION METHOD FOR A STATE OF A LIVESTOCK ANIMAL

(71) Applicant: SONY CORPORATION, Tokyo (JP)

(72) Inventors: Masakazu Yajima, Kanagawa (JP); Hideo Niikura, Tokyo (JP); Yasushi Ihara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/571,329

(22) PCT Filed: Apr. 6, 2016

(86) PCT No.: PCT/JP2016/001922
§ 371 (c)(1),
(2) Date: Nov. 2, 2017

(87) PCT Pub. No.: WO2016/181604
PCT Pub. Date: Nov. 17, 2016

(65) Prior Publication Data
US 2018/0279582 A1    Oct. 4, 2018

(30) Foreign Application Priority Data

May 12, 2015  (JP) ................. 2015-097687

(51) Int. Cl.
*A01K 11/00*    (2006.01)
*A01K 29/00*    (2006.01)
(Continued)

(52) U.S. Cl.
CPC .......... *A01K 29/005* (2013.01); *A01K 11/004* (2013.01); *A01K 11/006* (2013.01);
(Continued)

(58) Field of Classification Search
CPC .... A01K 11/00; A01K 29/005; A01K 11/004; A01K 11/008; A01K 11/006; G06T 7/00;
(Continued)

(56) References Cited

U.S. PATENT DOCUMENTS

| 5,984,875 A | * | 11/1999 | Brune | ................. A01K 11/007 600/549 |
| 6,081,607 A | * | 6/2000 | Mori | .................... A01K 11/006 340/5.8 |

(Continued)

FOREIGN PATENT DOCUMENTS

| JP | 07-008128 A | 1/1995 |
| JP | 2002-253523 A | 9/2002 |

(Continued)

OTHER PUBLICATIONS

International Search Report and Written Opinion of PCT Application No. PCT/JP2016/001922, dated Jul. 12, 2016, 10 pages of English Translation and 08 pages of ISRWO.

(Continued)

Primary Examiner — Jack K Wang
(74) Attorney, Agent, or Firm — Chip Law Group

(57) ABSTRACT

To provide a livestock management system, a sensor apparatus, and an estimation method for a state of a livestock animal with which states of livestock animals can be easily and accurately estimated. A livestock management system according to the present technology includes a management apparatus. The management apparatus includes a reception unit that receives power generation information from a sensor apparatus attachable to a livestock animal. The sensor apparatus includes a power generation unit, a transmission unit, and a control unit. The power generation unit generates electric power in a manner that depends on a surrounding environment. The transmission unit transmits the power generation information of the power generation unit with the (Continued)

electric power generated by the power generation unit. The control unit estimates a state of the livestock animal on the basis of the power generation information.

18 Claims, 21 Drawing Sheets

(51) Int. Cl.
*G06K 17/00* (2006.01)
*G06Q 50/02* (2012.01)

(52) U.S. Cl.
CPC ........ *A01K 11/008* (2013.01); *G06K 17/0029* (2013.01); *G06Q 50/02* (2013.01)

(58) Field of Classification Search
CPC .......... G06F 17/30265; G06K 17/0029; G06Q 50/02
USPC ..................................... 340/573.3; 348/231.2
See application file for complete search history.

(56) References Cited

U.S. PATENT DOCUMENTS

| | | | | |
|---|---|---|---|---|
| 7,705,736 | B1* | 4/2010 | Kedziora | A01K 11/008 340/573.3 |
| 7,868,769 | B2* | 1/2011 | March | A01K 11/008 340/573.1 |
| 9,226,481 | B1* | 1/2016 | Paripati | G06T 7/0004 |
| 9,370,170 | B2* | 6/2016 | Downing | A01K 29/005 |
| 2002/0010390 | A1* | 1/2002 | Guice | A01K 11/008 600/300 |
| 2005/0145187 | A1* | 7/2005 | Gray | A01K 11/008 119/174 |
| 2008/0314325 | A1* | 12/2008 | Hempstead | A01K 11/004 119/51.02 |
| 2010/0030036 | A1* | 2/2010 | Mottram | A01K 11/00 600/301 |
| 2012/0326874 | A1* | 12/2012 | Kwak | A01K 11/006 340/573.3 |
| 2013/0138389 | A1* | 5/2013 | Gyongy | A61B 5/1118 702/141 |
| 2013/0178721 | A1* | 7/2013 | Bird | A01K 11/007 600/301 |
| 2013/0197323 | A1* | 8/2013 | Rettedal | A01K 11/007 600/302 |
| 2016/0120628 | A1* | 5/2016 | Kapil | A61D 1/025 604/22 |
| 2018/0228129 | A1* | 8/2018 | Yajima | A01K 11/00 |
| 2018/0325382 | A1* | 11/2018 | Brandao | A01K 11/006 |

FOREIGN PATENT DOCUMENTS

| | | |
|---|---|---|
| JP | 2007-189987 A | 8/2007 |
| JP | 2009-159927 A | 7/2009 |
| JP | 2011-081529 A | 4/2011 |
| JP | 2011-234668 A | 11/2011 |
| JP | 2014-180217 A | 9/2014 |

OTHER PUBLICATIONS

International Preliminary Report on Patentability of PCT Application No. PCT/JP2016/001922, dated Nov. 23 2017, 10 pages of English Translation and 05 pages of IPRP.

* cited by examiner

LIVESTOCK MANAGEMENT SYSTEM, SENSOR APPARATUS, AND ESTIMATION METHOD FOR A STATE OF A LIVESTOCK ANIMAL

CROSS REFERENCE TO RELATED APPLICATIONS

This application is a U.S. National Phase of International Patent Application No. PCT/JP2016/001922 filed on Apr. 22, 2016, which claims priority benefit of Japanese Patent Application No. JP 2015-097687 filed in the Japan Patent Office on May 12, 2015. Each of the above-referenced applications is hereby incorporated herein by reference in its entirety.

TECHNICAL FIELD

The present technology relates to a livestock management system, a sensor apparatus, and an estimation method for a state of a livestock animal.

BACKGROUND ART

There have been attempts to suitably manage livestock animals to improve meat quality and the like by introducing apparatuses or systems for livestock management into stock-breeding facilities.

For example, Patent Literature 1 describes a livestock and poultry feeding management system in which the meat quality can be predicted by analyzing growth data and environment data of livestock.

Further, Patent Literature 2 describes a technology in which a correlation between a living body impedance and meat quality of cattle is statistically grasped and the living body impedance of the cattle is measured to thereby predict the meat quality in the living body.

CITATION LIST

Patent Literature

Patent Literature 1: Japanese Patent Application Laid-open No. HEI 7-8128
Patent Literature 2: Japanese Patent Application Laid-open No. 2002-253523

DISCLOSURE OF INVENTION

Technical Problem

However, in the technology described in Patent Literature 1, it is impossible to predict the meat quality on the basis of information on individual livestock or poultry animals. Thus, there is a problem regarding prediction accuracy.

Further, in the technology of Patent Literature 2, it is necessary to measure the living body impedance of individual livestock animals. That is a heavy burden especially to large-scale farmers.

In view of the above-mentioned circumstances, it is an object of the present technology to provide a livestock management system, a sensor apparatus, and an estimation method for a state of a livestock animal with which states of livestock animals can be easily and accurately estimated.

Solution to Problem

In order to accomplish the above-mentioned object, a livestock management system according to an embodiment of the present technology includes a management apparatus.

The management apparatus includes a reception unit that receives power generation information from a sensor apparatus attachable to a livestock animal and including a power generation unit that generates electric power in a manner that depends on a surrounding environment and a transmission unit that transmits the power generation information of the power generation unit with electric power obtained by the power generation unit, and a control unit that estimates a state of the livestock animal on the basis of the power generation information.

A sensor apparatus according to another embodiment of the present technology includes a casing, a power generation unit, and a control unit.

The power generation unit is accommodated in the casing and generates electric power in a manner that depends on a surrounding environment.

The control unit is accommodated in the casing and estimates a state of the livestock animal on the basis of the power generation information.

An estimation method for a state of a livestock animal according to still another embodiment of the present technology includes a step of receiving, by a control unit of an information processing apparatus, power generation information of a power generation unit from a sensor apparatus attached to the livestock animal, the sensor apparatus including the power generation unit that generates electric power in a manner that depends on a surrounding environment; and a step of estimating the state of the livestock animal on the basis of the power generation information.

Advantageous Effects of Invention

As described above, in accordance with the present technology, it becomes possible to easily and accurately estimate states of livestock animals.

It should be noted that the effects described here are not necessarily limitative and any effect described in the present disclosure may be provided.

BRIEF DESCRIPTION OF DRAWINGS

FIG. 6 A flowchart describing an example of a flow of processing when the sensor apparatus transmits power generation information and the like.

MODE(S) FOR CARRYING OUT THE INVENTION

Hereinafter, embodiments according to the present technology will be described with reference to the drawings.

<First Embodiment>

[Configuration of Livestock Management System]

Figure 1:
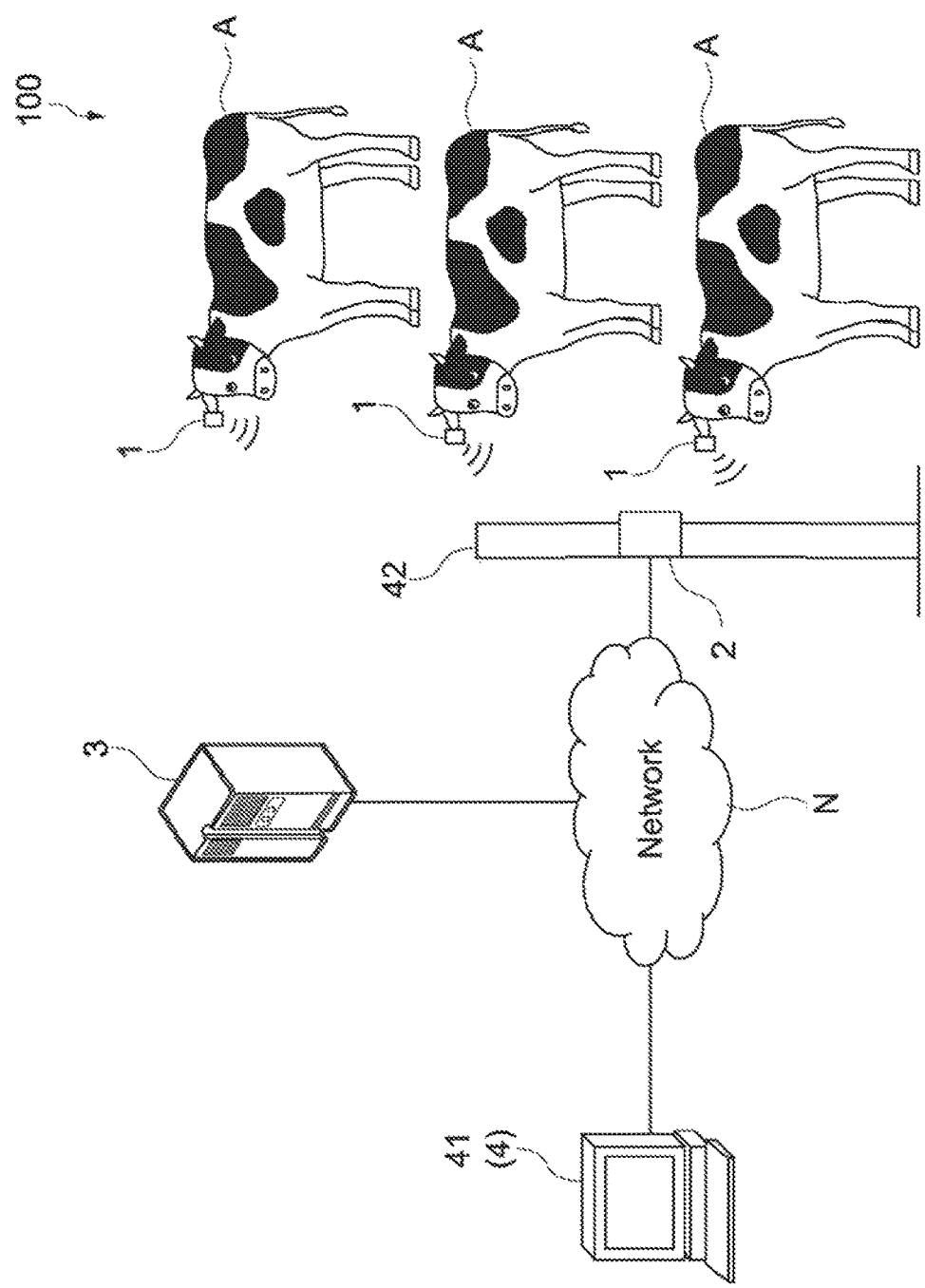
FIG. 1 A schematic diagram showing a schematic configuration of a livestock management system according to a first embodiment.

FIG. 1 is a schematic diagram showing a schematic configuration of a livestock management system according to a first embodiment of the present technology.

As shown in the figure, a livestock management system 100 includes a plurality of sensor apparatuses 1, a communication apparatus 2, and a management apparatus 3.

The livestock management system 100 is, for example, a system introduced into a stockbreeding facility. The management apparatus 3 is configured to be capable of acquiring predetermined information from the sensor apparatus 1 attached to each livestock animal A and estimating a state of the livestock animal A.

Examples of the livestock animals can include beef cattle, cows, pigs, horses, sheep, goats, and poultry that are industrial animals and dogs, cats, and rabbits that are pets. Hereinafter, beef cattle will be taken as an example.

Although the stockbreeding facility is not particularly limited as long as the above-mentioned livestock animals can be accommodated, an example including a barn in which the livestock animals can be accommodated and a pasture in which the livestock animals can graze will be described hereinafter.

As shown in FIG. 1, the plurality of sensor apparatuses 1 are respectively attachable to a plurality of livestock animals A. For example, each of the plurality of sensor apparatuses 1 is attached to an ear of each livestock animal A. Note that the attachment position is not limited to the ear and it may be attached to a site other than the ear, such as a neck, a back, and a leg. It should be noted that it is more favorable to attach the sensor apparatus 1 to the ear rather than the neck or leg for the purpose of lowering the possibility that the sensor apparatus 1 may be detached due to behavior of the livestock animal A to rub itself against a fence or the like or its collision with another livestock animal.

The communication apparatus 2 receives information transmitted from the sensor apparatus 1 and transmits the received information to the management apparatus 3 in a network N. The network N can be, for example, the Internet, a local area network, or the like. As shown in the figure, the communication apparatus 2 may be, for example, attached to a gate 42 or the like of the stockbreeding facility.

The management apparatus 3 is a server apparatus in the network N and receives predetermined information from the sensor apparatus 1 which has been transmitted through the communication apparatus 2. The management apparatus 3 is, for example, configured as an information processing apparatus.

The livestock management system 100 may be further connected to a master monitor apparatus 41 of a stockbreeding system 4 introduced into the stockbreeding facility via the network N.

Figure 2:
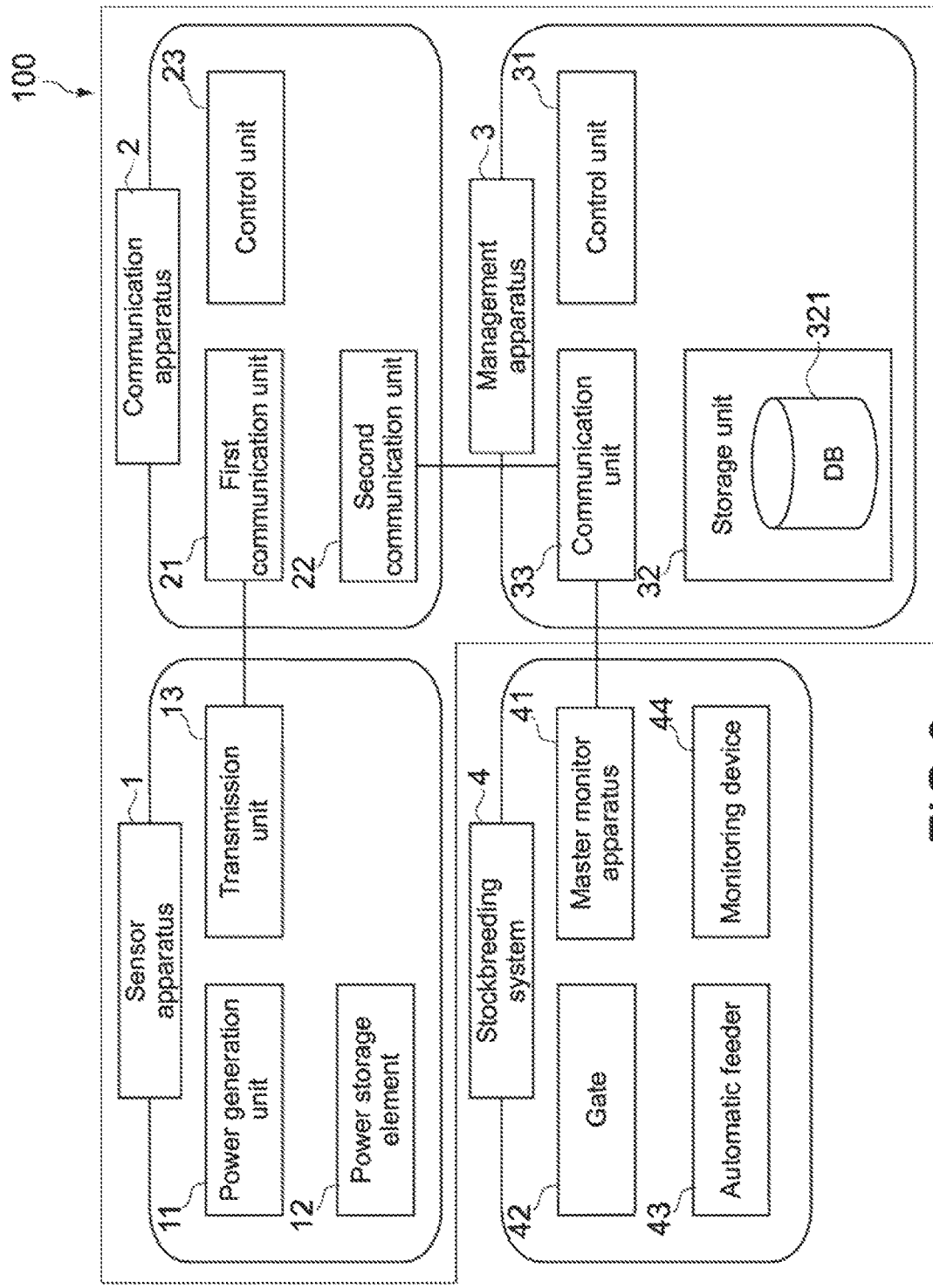
FIG. 2 A block diagram showing a configuration of the livestock management system.

FIG. 2 is a block diagram showing a configuration of each of apparatuses of the livestock management system 100. A configuration of each apparatus will be described with reference to the figure.

(Sensor Apparatus)

As shown in FIG. 2, the sensor apparatus 1 includes a power generation unit 11, a power storage element 12, and an output unit (transmission unit) 13.

The power generation unit 11 is a power generator that generates electric power in a manner that depends on a surrounding environment. The power generation unit 11 may be a solar battery that performs power generation with energy based on at least any one of, for example, light, heat, vibration, radio waves including a far electromagnetic field and a near electromagnetic field, and particular organic and inorganic matters. Any power generation methods can be employed and, for example, an electrostatic type, electromagnetic type, an inverse magnetostrictive type, or a piezoelectric type can be employed.

The power generation unit 11 may perform power generation with light (e.g., indoor light bulb and solar light).

The power generation unit 11 may be a thermoelectric conversion element that performs power generation by utilizing a temperature difference (heat) (e.g., one that performs power generation by using the Seebeck effect and the Thomson effect, thermionic power generation element, or one that performs thermomagnetic generation). Such a power generation unit 11 performs power generation by utilizing, for example, a temperature difference between a body temperature of a livestock animal and an ambient temperature.

The power generation unit 11 may be an enzyme battery (also called bio-battery or the like) that performs power generation by utilizing glucose.

The power generation unit 11 utilizes any of LCR (inductance, capacitance, and reactance) components or a combination thereof and capacitive coupling or electromagnetic coupling with a capacitor, an antenna, a rectenna, and the like. The power generation unit 11 may perform power generation with radio waves, for example.

The power generation unit 11 may perform near electromagnetic field power generation, in other words, perform power generation with energy obtained by bringing a sensor apparatus into the proximity of a predetermined device. A well-known method such as a magnetic field resonance method, an electromagnetic induction method, electric field coupling, and an electric field resonance method can be applied to a method for near electromagnetic field power generation.

A well-known power generation element other than those exemplified above can be applied to the power generation unit 11.

The power storage element 12 is used in a manner that depends on purposes, for example, storing electric power generated by the power generation unit 11. The electric power generated by the power generation unit 11 is stored in the power storage element 12 and used as electric power for actuating the transmission unit 13.

Besides various secondary batteries such as a lithium-ion secondary battery, the power storage element 12 includes an electric double layer capacitor, a lithium ion capacitor, a polyacenic semiconductor (PAS) capacitor, a Nanogate capacitor ("Nanogate" is a registered trademark of Nanogate Aktiengesellschaft), a ceramic capacitor, a film capacitor, an aluminum electrolytic capacitor, a tantalum capacitor, and the like. Depending on purposes, a combination of these power storage elements may be used. Further, if the sensor apparatus 1 is attached to a livestock animal, it is also conceivable that the sensor apparatus 1 may be used in an outdoor cold region and the like. In this case, if the power storage element 12 is constituted by a capacitor such as the ceramic capacitor, electric power can be sufficiently stored also at a low temperature and problems such as lowering of power storage efficiency and inability to store electric power hardly occur. Thus, it is favorable. If the power storage element 12 is constituted by the capacitor such as the ceramic capacitor, also in an environment below 0° C. (e.g., cold region where an environmental temperature is equal to or lower than −11° C. or −21° C. in breeding of cattle), the sensor apparatus 1 is capable of storing electric power generated by the power generation unit 11 in the power storage element 12 constituted by the capacitor and transmitting power generation information from the transmission unit 13 with the stored electric power.

The transmission unit 13 transmits power generation information of the power generation unit 11 with electric power obtained by the power generation unit 11.

In this embodiment, the transmission unit 13 is configured to be switchable between a stand-by state and a transmission state in which transmission of the power generation information is possible in a manner that depends on electric power supplied from the power generation unit. With this, if a power generation amount of the power generation unit 11 becomes equal to or larger than a predetermined amount, it becomes possible to transmit predetermined information as power generation information indicating the fact of power generation of a power generation amount equal to or larger than the predetermined amount. Note that information on a value indicating the power generation amount of the power generation unit 11 may be included in the power generation information to be transmitted.

The transmission unit 13 includes, for example, an integrated circuit (IC) formed of one or more elements, a processor that controls transmission, and communication circuit and antenna for communicating with the communication apparatus 2.

Examples of the integrated circuit used in the transmission unit 13 can include a switching element such as a transistor, a diode, a reset IC, a regulator IC, a logic IC, and various arithmetic circuits. A circuit configuration inside the IC can be changed in a manner that depends on needs as long as it can realize the function of the transmission unit 13. Further, although the transmission unit 13 is favorably configured to be capable of retaining and storing a state after switching, the transmission unit 13 may be configured to be incapable of retaining and storing that state due to reset or the like.

Note that a description will be hereinafter made assuming that the reset IC is used as the integrated circuit of the transmission unit 13.

Further, electric power generated by the power generation unit 11 may be appropriately supplied to the transmission unit 13 after the voltage is increased or lowered.

The processor used in the transmission unit 13 controls the communication circuit. Examples of that processor can include an MPU (Micro Processing Unit) and a CPU (Central Processing Unit). The MPU is more favorable as the processor because of the throughput of the transmission unit 13 and a requirement for downsizing in the sensor apparatus 1.

The communication performed by the communication circuit of the transmission unit 13 may be wireless or may be wired. Further, a wireless circuit may be single, may be of various types, or may be a composite circuit including the various types. The wireless communication may be communication utilizing electromagnetic waves (including infrared rays) or may be communication utilizing an electric field. Examples of a specific method therefor can include a communication method utilizing a band of several hundreds MHz (megahertz) to several GHz (gigahertz) such as "Wi-Fi (registered trademark)", "ZigBee (registered trademark)", "Bluetooth (registered trademark)", "Bluetooth Low Energy", "ANT (registered trademark)", "ANT+ (registered trademark)", and "EnOcean (registered trademark)". Proximity wireless communication such as NFC (Near Field Communication) may be employed.

In addition, the transmission unit 13 in the transmission state may transmit an identifier (ID) allocated to the power generation unit 11 as the power generation information. With this, the management apparatus 3 is capable of determining from which power generation unit 11 the acquired power generation information comes.

The identifier may be allocated to each power generation unit 11 of the sensor apparatus 1 or may be allocated to each module to be described later.

Note that the identifier may be an identifier allocated in advance or may be an identifier allocated as necessary. For example, when the sensor apparatus 1 establishes communication connection with another device, an identifier may be allocated to each module and the allocated identifier may be used.

The identifier is set corresponding to the sensor apparatus 1 attached to the livestock animal or the power generation unit 11, circuit, or the like of the sensor apparatus 1 as described above. Thus, the livestock animals can be discriminated from one another with the identifiers.

(Communication Apparatus)

The communication apparatus 2 is configured to be capable of communicating with each of the transmission unit 13 and a communication unit 33 and transmitting to the communication unit 33 the power generation information transmitted from the transmission unit 13. Further, although only the sensor apparatus 1 is shown in the figure, the communication apparatus 2 is configured to be capable of communicating with a plurality of sensor apparatuses.

As shown in FIG. 2, the communication apparatus 2 includes a first communication unit 21, a second communication unit 22, and a control unit 23.

The first communication unit 21 is configured to be capable of communicating with the transmission unit 13 of the sensor apparatus 1. The first communication unit 21 includes communication circuit and antenna for communicating with the transmission unit 13. The first communication unit 21 is configured to be capable of performing, for example, communication utilizing electromagnetic waves (including infrared rays), wireless communication such as communication utilizing an electric field, or communication with wires.

The second communication unit 22 is configured to be capable of connecting to the network N and communicating with the management apparatus 3. The second communication unit 22 includes communication circuit and antenna for connecting to the network N and performing communication. Specifically, the second communication unit 22 is capable of connecting to the network N and communicating with the management apparatus 3 by using a wireless LAN (IEEE802.11, etc.) such as WiFi (Wireless Fidelity) and a 3G or 4G network for mobile communication.

The control unit 23 controls the first communication unit 21 and the second communication unit 22 and is, for example, realized by a CPU.

Note that the communication apparatus 2 may further include a storage unit such as a CPU, a RAM, and a ROM (not shown).

(Management Apparatus)

As shown in FIG. 2, the management apparatus 3 includes a CPU (control unit) 31, a storage unit 32, and the communication unit 33. The management apparatus 3 may be constituted by one or more servers.

The CPU 31 functions as a control unit of the management apparatus 3 and estimates a state of the livestock animal on the basis of the power generation information.

The storage unit 32 includes, for example, a ROM in which programs to be executed by the CPU 31 are stored and a RAM to be used as a work memory or the like when the CPU 31 executes processing. The storage unit 32 may further include an HDD (Hard Disk Drive) and a nonvolatile memory such as a flash memory (SSD; Solid State Drive). With this, the storage unit 32 is capable of storing a livestock management database 321.

The communication unit 33 is a configuration for connecting to the Internet N and communicating with the communication apparatus 2 and the stockbreeding system 4. The communication unit 33 functions as a "reception unit".

Specifically, the communication unit 33 is configured to be capable of performing communication with wires using an NIC (Network Interface Card) for Ethernet (registered trademark) or wireless communication using a wireless LAN (IEEE802.11, etc.) such as WiFi (Wireless Fidelity) and a 3G or 4G network for mobile communication.

The management apparatus 3 may include configurations such as an input device, a display device, and a speaker besides the above-mentioned configurations in a manner that depends on needs, though not shown in the figure.

As shown in FIG. 2, the management apparatus 3 is connected to the stockbreeding system 4.

The stockbreeding system 4 includes, for example, a master monitor apparatus 41, a plurality of gates 42 of the stockbreeding facility, an automatic feeder 43, various monitoring devices 44, and the like.

As shown in the figure, the master monitor apparatus 41 acquires information processed by the management apparatus 3 via the network N and controls each device of the stockbreeding facility on the basis of this information. Specifically, for example, the master monitor apparatus 41 may acquire such information by receiving the information from the management apparatus 3 through a communication circuit or may acquire such information by reading out the information once stored in a storage medium such as a memory. The master monitor apparatus 41 is typically constituted by an information processing apparatus such as a PC (Personal Computer), a smartphone, and a tablet terminal. Specifically, the master monitor apparatus 41 may include a control unit constituted by a CPU, a storage unit including a ROM, a RAM, other memories, and the like, a communication unit including communication circuit and antenna, and a display unit including a display such as a liquid-crystal display and an OLED (Organic Light Emitting Diode).

The gate 42 is, for example, a gate partitioning between a barn and a pasture. Although not shown in the figure, the gate 42 includes a driving mechanism for opening and closing. In the gate 42, opening and closing are controlled by the master monitor apparatus 41 controlling the driving mechanism. Note that, as shown in FIG. 1, the communication apparatus 2 may be arranged in at least one of the plurality of gates 42.

The automatic feeder 43 is an apparatus for automatically supplying feed to the livestock animals. Although not shown in the figure, the automatic feeder 43 includes a feed tank, a feeder for feeding, a conveying mechanism for conveying feed to a feeder from a tank, and the like. In the automatic feeder 43, for example, a feed-feeding timing, an amount of feed, a mixing rate of two or more kinds of feed, and the like are controlled by the master monitor apparatus 41.

The monitoring devices 44 are devices arranged at predetermined positions in the stockbreeding facility. The monitoring devices 44 are, for example, constituted by a surveillance camera, an infrared sensor, and the like. The monitoring devices 44 monitor how the livestock animals and the stockbreeding facility are, for example, and transmit acquired information to the master monitor apparatus 41.

Besides, the stockbreeding system 4 may include an air conditioner installation, a lighting apparatus, and the like of the stockbreeding facility in a manner that depends on needs.

[Detailed Configuration of Sensor Apparatus]

Figure 3:
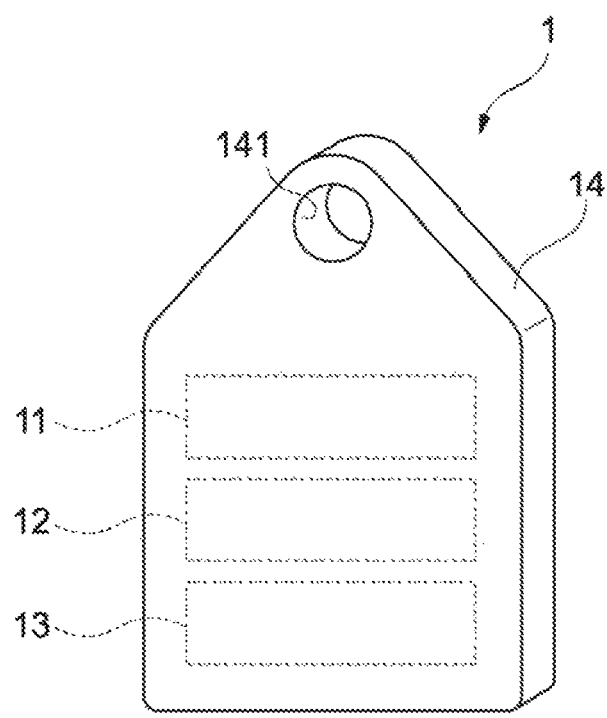
FIG. 3 A view showing an example of an outer appearance of a sensor apparatus of the livestock management system.

FIG. 3 is a view showing an example of an outer appearance of the sensor apparatus 1.

As shown in the figure, the sensor apparatus 1 further includes a casing 14 that accommodates the power generation unit 11 and the transmission unit 13. The power storage element 12 may be also accommodated in the casing 14. All the modules to be described later can be accommodated in the casing 14. Note that the power generation unit 11, the power storage element 12, and the transmission unit 13 shown in the figure schematically show the fact that these elements are accommodated in the sensor apparatus 1.

The casing 14 includes, for example, a hole for attachment 141. As shown in FIG. 1, the casing 14 is configured to be attachable to the livestock animal A via this hole 141. The casing 14 may be attached to the vicinity of an earmark for individual identification, for example. Alternatively, as another example, the casing 14 may include an attachment mechanism for attachment to the livestock animal and the casing 14 may be attached via a member including another attachment mechanism.

The casing 14 may be, for example, formed of a resin material and the like such as an ABS resin, a polycarbonate resin, a polylactic acid, and a polyamide resin. At least a part thereof is formed of a light transmissive material capable of transmitting solar light therethrough.

Further, considering the ecology and the safety for living bodies, a material including a plant-derived material, an antiallergic material, an antibacterial material, or the like can be appropriately selected as the material of the casing 14. In addition, a food additive disliked by livestock animals may be mixed therein for preventing accidental ingestion.

In this embodiment, the sensor apparatus 1 does not include structures including a lid or the like for replacement of the power storage element 12 such as a battery and a connector or the like for connecting to an external apparatus. Thus, the casing 14 can have a gas-tight structure such that the casing 14 can prevent external gas and liquid from entering it. Specifically, the entire casing 14 can be integrally molded. Alternatively, if the casing 14 is configured by combining a plurality of parts, seal rings or the like can be provided at seams of the parts such that the respective parts of the casing 14 are held in close contact with each other.

Due to the casing 14 having such a gas-tight structure, the sensor apparatus 1 can have a configuration excellent in water resistance, dust resistance, shock resistance, and corrosion resistance. With this, it is possible to provide the sensor apparatus 1 excellent in durability also in a livestock breeding environment severe for the sensor apparatus, where it is liable to be affected by excrement and urine, weather, feed, dust, collision between livestock animals, and the like.

Figure 4:
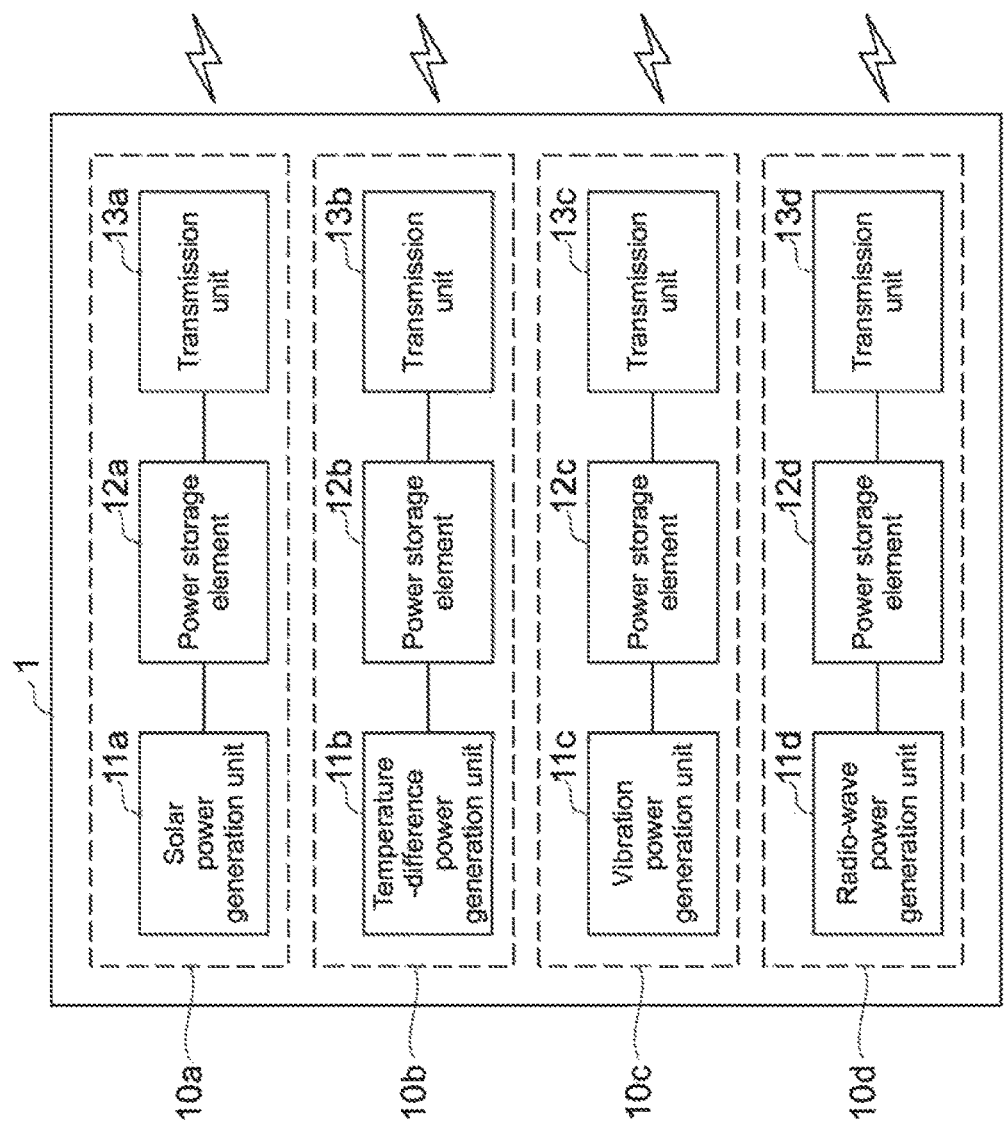
FIG. 4 A block diagram showing an example of the sensor apparatus.

FIG. 4 is a block diagram showing an example of the sensor apparatus 1 according to this embodiment. The sensor apparatus 1 includes one or more modules, for example.

As shown in the figure, the sensor apparatus 1 includes, for example, four modules (module 10a, module 10b, module 10c, and module 10d). Each of the modules includes, for example, the power generation unit 11, the power storage element 12, and the transmission unit 13 which have been described above.

As shown in FIG. 4, the module 10a includes a solar power generation unit 11a that performs power generation with radiated solar light as an example of the power generation unit. In addition, the module 10a includes a power storage element 12a to be connected to the solar power generation unit 11a and a transmission unit 13a to be connected to the power storage element 12a.

The module 10b includes a temperature-difference power generation unit 11b that performs power generation by utilizing a temperature difference as an example of the power generation unit. In addition, the module 10b includes a power storage element 12b to be connected to the temperature-difference power generation unit 11b and a transmission unit 13b to be connected to the power storage element 12b.

The module 10c includes a vibration power generation unit 11c that performs power generation in a manner that depends on vibration as an example of the power generation unit. In addition, the module 10c includes a power storage element 12c to be connected to the vibration power generation unit 11c and a transmission unit 13c to be connected to the power storage element 12c.

The module 10d includes a radio-wave power generation unit 11d that performs power generation by utilizing radio waves as an example of the power generation unit. In addition, the module 10d includes a power storage element 12d to be connected to the radio-wave power generation unit 11d and a transmission unit 13d to be connected to the power storage element 12d. In this manner, in the sensor apparatus 1, the transmission unit is provided corresponding to each power generation unit as an example.

An example of a specific configuration of the module will be described taking the module 10a as an example.

Figure 5:
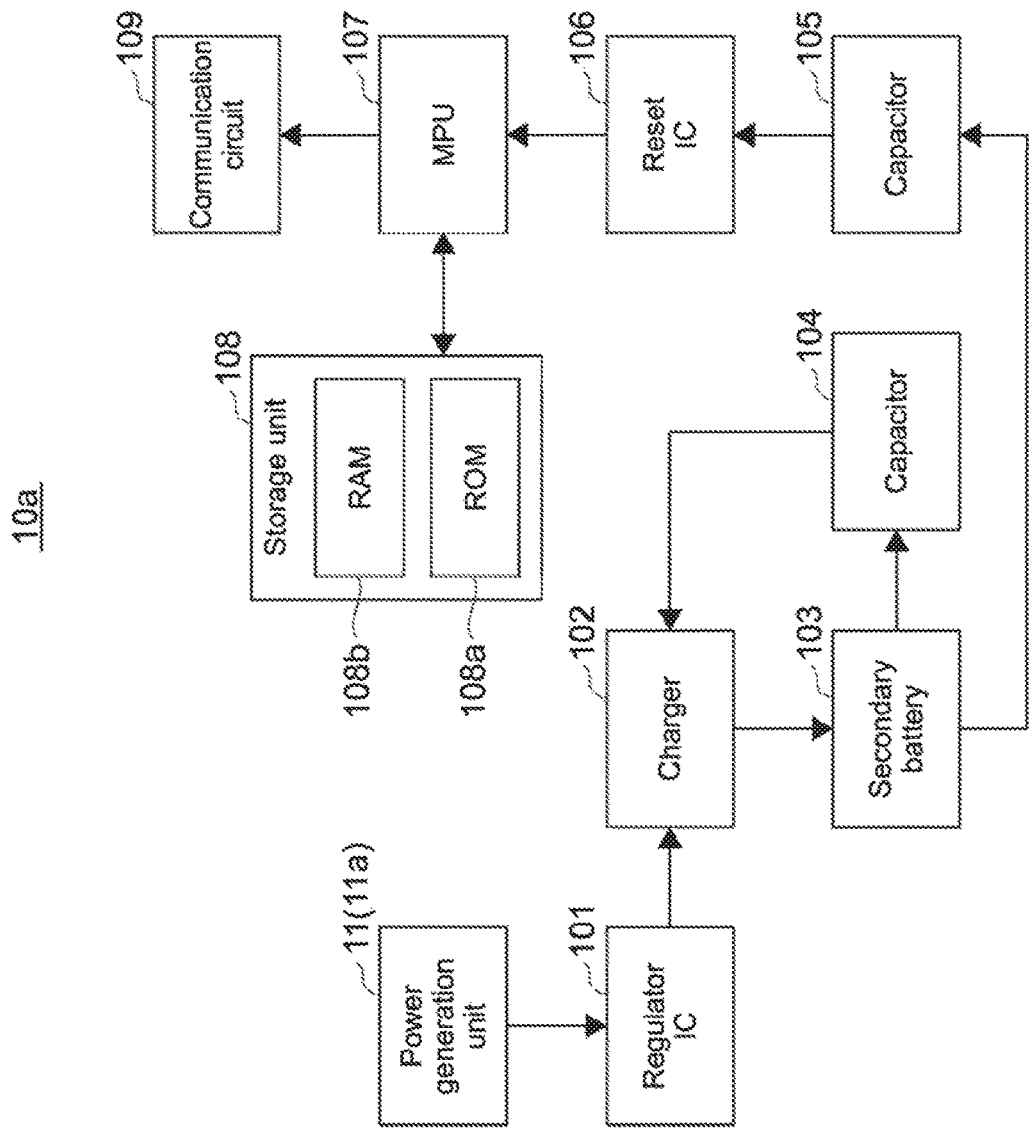
FIG. 5 A diagram showing an example of a specific configuration of a module of the sensor apparatus.

FIG. 5 is a diagram showing an example of a specific configuration of the module 10a.

The module 10a has a configuration including an power generation unit 11, a regulator IC 101, a charger 102, a secondary battery 103, a capacitor 104, a capacitor 105, a reset IC 106, an MPU 107, a storage unit 108, and a communication circuit 109, for example. The storage unit 108 has a configuration including a ROM (Read Only Memory) 108a and a RAM (Random Access Memory) 108b, for example.

As described above, the power generation unit 11 in the module 10a is the solar power generation unit 11a formed of a solar battery.

The regulator IC 101 is supplied with electric power generated by the power generation unit 11. The regulator IC 101 increases or decreases an input voltage so as to keep an output voltage. Whether the regulator IC 101 increases or decreases the voltage depends on the configuration of the power generation unit 11.

The output voltage of the regulator IC 101 is supplied to the charger 102.

The charger 102 is a circuit that charges the secondary battery 103 by utilizing electric power supplied from the regulator IC 101. Note that a configuration in which the charger 102 controls discharge of the secondary battery 103 may be employed. The charger 102 may monitor the presence/absence of an abnormality of the secondary battery 103. Under the charge control of the charger 102, the secondary battery 103 is charged.

The secondary battery 103 is a rechargeable battery. Examples of the secondary battery 103 can include a lithium-ion secondary battery. As a matter of course, another secondary battery may be employed. The capacity of the secondary battery 103 may be, for example, approximately several 10 μWh (microwatt hour) or may be several mWh (milliwatt hour). Therefore, the secondary battery 103 does not increase in size. An output voltage of the secondary battery 103 is supplied to the capacitor 104 and the capacitor 105.

Due to the output voltage from the secondary battery 103, electric power is stored in the capacitor 104. The electric power stored in the capacitor 104 is used as a power supply of the charger 102. A power supply for actuating the charger 102 may be additionally provided.

Due to the output voltage from the secondary battery 103, electric power is stored in the capacitor 105. The capacitor 105 is provided for taking out a weak current, for example. Further, in a case of using the capacitor 105 and using the reset IC 106 as the transmission unit, the reset IC 106 and the like can perform operations depending on the voltage of the capacitor 105 and the configuration of the circuit can be simplified. Note that a configuration in which the secondary battery 103 is connected to the reset IC 106 without the capacitor 105 may be employed. The secondary battery 103, the capacitor 104, and the capacitor 105 correspond as an example of the above-mentioned power storage element 12.

Further, the module 10a may include a ceramic capacitor instead of the secondary battery 103. In this case, the power storage element 12 may only include the ceramic capacitor or may include the capacitors 104 and 105 besides the ceramic capacitor.

The reset IC 106 is an example of the above-mentioned integrated circuit of the transmission unit 13. The reset IC 106 includes, for example, a comparator that compares a voltage of the capacitor 105 with a reference voltage, for example, and an element such as a transistor that is turned on/off in a manner that depends on an assessment result. The reference voltage is, for example, set to be equal to or higher than an operating voltage (e.g., 3.3 V or 5 V) of the MPU 107.

The reset IC 106 switches from the off-state to the on-state once the voltage of the capacitor becomes equal to or higher than the reference voltage. The capacitor 105 and the MPU 107 are connected to each other correspondingly to switching of the reset IC 106 to the on-state. Then, electric power stored in the capacitor 105 is supplied as the operating voltage of the MPU 107.

The MPU 107 is connected to the reset IC 106 and the communication circuit 109. The MPU 107 operates with electric power, which is supplied corresponding to switching of the reset IC 106 to the on-state, as a power supply. The MPU 107 controls the communication circuit 109 and the like.

The storage unit 108 to be connected to the MPU 107 includes, for example, the ROM (Read Only Memory) 108a and the RAM (Random Access Memory) 108b. Programs to be executed by the MPU 107 are, for example, stored in the ROM 108a. Note that an identifier allocated to the module 10a in advance may be stored in the ROM 108a. The RAM 108b is used as a work memory or the like when the MPU 107 executes processing. For example, if the identifier of the module 10a is allocated when communication connection is established, the allocated identifier may be stored in the RAM 108b.

Under the control of the MPU 107, the communication circuit 109 performs processing based on a predetermined communication method and is an example of the above-mentioned communication circuit of the transmission unit 13. Although the illustration is omitted, the communication circuit 109 includes a small antenna such as a film antenna, a pattern antenna, and a bar antenna or a capacitor sufficiently satisfying antenna's functions. As described above, a well-known method can be applied to the communication method performed by the communication circuit 109 and it is not limited to a particular communication method.

Note that a configuration in which the storage unit 108 is connected to the communication circuit 109 may be employed. A configuration in which a plurality of (e.g., two) storage units are connected to each of the MPU 107 and the communication circuit 109.

Although the example of the configuration of the module 10a has been described above, configurations of the other modules may be appropriately changed in a manner that depends on the configuration and the like of the power generation unit. For example, a module including a power generation unit 11 installing power generators of different types can be used. For example, the power generation unit 11a of the module 10a can be constituted by a solar power generator and the power generation unit 11b of the module 10b can be constituted by a vibration power generator. Further, for example, the configurations of the transmission unit of the module 10a and the transmission unit of the module 10b may be different configurations. If a configuration different from the configuration described above is employed, for example, if the output of the power generation unit is alternating current, a rectification circuit may be provided on an output side of the power generation unit.

Some configurations in the sensor apparatus 1 may be made common between the respective modules. For example, a configuration in which the secondary battery 103 (or ceramic capacitor) or the like of the respective modules may be made common and electric power generated by power generation units 11 of these modules is stored in the identical secondary battery 103 (or ceramic capacitor) may be employed. A configuration in which MPUs of the respective modules can access the storage unit 108 may be employed. The storage area of the storage unit 108 may be divided into a plurality of sections and storage areas dedicated to the respective modules may be allocated thereto. A configuration in which the respective modules use the respective storage areas in a time-division manner may be employed. Alternatively, a control method in which the respective modules sequentially use the allocated storage areas may be applied to the sensor apparatus 1.

The sensor apparatus 1 having such a configuration basically operates due to power generation by the power generation unit 11. Therefore, configurations of a battery, a battery for driving a circuit, and the like can be made unnecessary.

With this, the sensor apparatus 1 according to this embodiment can save troubles of replacement, charge, and the like of the battery and reduce the costs of disposal and replacement due to dead of a battery or the like.

Further, the sensor apparatus 1 can constantly perform monitoring and can be downsized by making the battery, the battery for driving the circuit, and the like unnecessary. Further, due to its small size, the sensor apparatus 1 can reduce the risk of detachment and malfunction caused by collision or the like between livestock animals.

In addition, downsizing of the sensor apparatus 1 can reduce the stress of the livestock animal during attachment.

[Operation Example of Sensor Apparatus]

Figure 6:
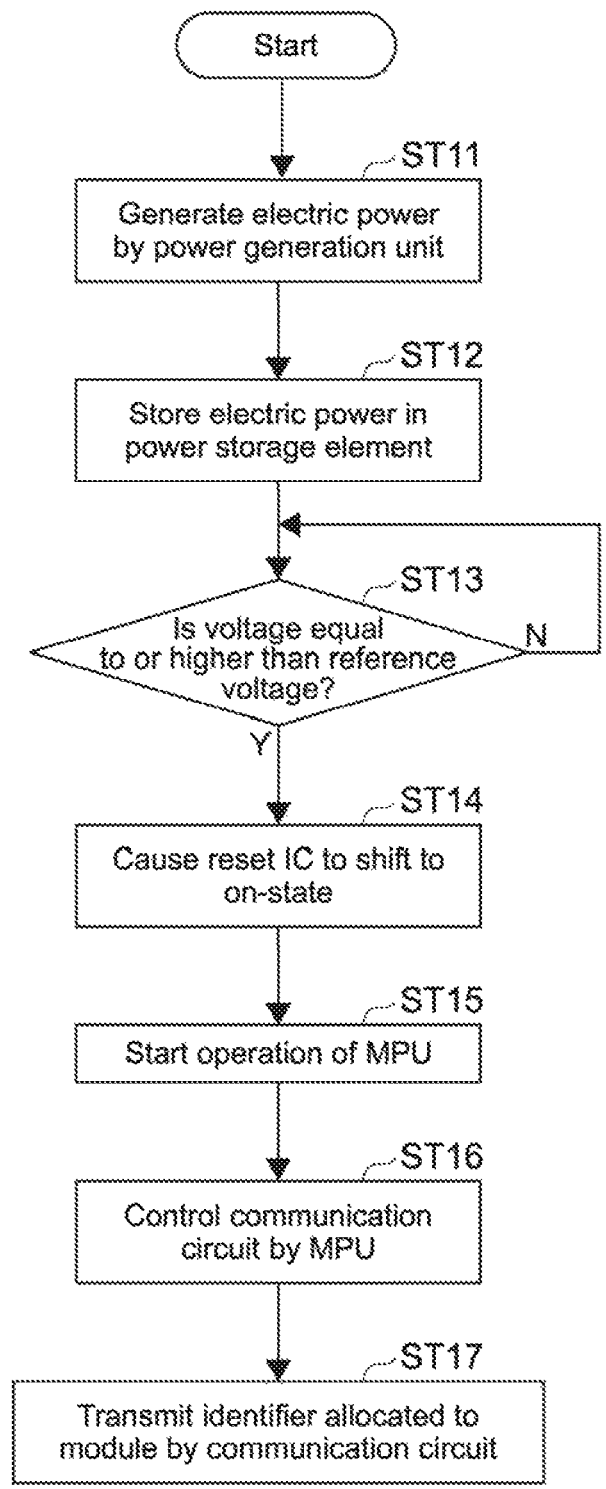

FIG. 6 is a flowchart describing an example of a flow of processing when the sensor apparatus 10 transmits power generation information and the like. Here, an example of the flow of processing in the module 10a will be described. Although flows of processing of the other modules are substantially similar to that of the module 10a, there may be differences depending on the configurations of the modules. The processes of the respective modules are independently performed, for example.

In Step ST11, the power generation unit 11 (in this example, the solar power generation unit 11a) performs power generation. For example, a user wearing the sensor apparatus 1 goes outside in fine weather, the power generation unit 11 is irradiated with solar light, and thus the power generation unit 11 performs power generation. As a matter of course, in case of bad weather or cloudy weather, the power generation unit 11 does not perform power generation or generates little electric power. Then, the processing proceeds to Step ST12.

In Step ST12, electric power generated by the power generation unit 11 is supplied to the capacitor 105 that is one of the power storage elements via the regulator IC 101 or the like. Then, electric power is stored in the capacitor 105 and the voltage of the capacitor 105 increases. Then, the processing proceeds to Step ST13.

In Step ST13, it is determined whether or not the voltage of the capacitor 105 is equal to or higher than the reference voltage. If the voltage of the capacitor 105 is lower than the reference voltage, the processing returns to Step ST13. If the voltage of the capacitor 105 is equal to or higher than the reference voltage, the processing proceeds to Step ST14.

In Step ST14, correspondingly to the fact that the voltage of the capacitor 105 is equal to or higher than the reference voltage, the reset IC 106 switches from the off-state to the on-state. Note that, correspondingly to the fact that the voltage of the capacitor 105 is equal to or higher than the reference voltage, the state of the reset IC 106 switches and the determination processing in Step ST13 is not performed due to a certain functional block. Correspondingly to the fact that the reset IC 106 switches to the on-state, an output voltage of the capacitor 105 is supplied to the MPU 107. Then, the processing proceeds to Step ST15.

In Step ST15, the MPU 107 operates with electric power supplied from the capacitor 105 as the power supply. The MPU 107 reads out a program stored in the ROM 108a, for example, and executes processing depending on a code described in the program. Then, the processing proceeds to Step ST16.

In Step ST16, the MPU 107 supplies electric power to the communication circuit 109 and controls the communication circuit 109. That is, the MPU 107 instructs the communication circuit 109 to start communication and, for example, instructs the communication circuit 109 to transmit the identifier of the module 10a to the communication apparatus 2. Then, the processing proceeds to Step ST17.

In Step ST17, the communication circuit 109 performs communication under the control of the MPU 107. The communication circuit 109 transmits the identifier allocated to the module 10a, for example, to the communication apparatus 2 in accordance with a predetermined communication method.

In this embodiment, transmission of the identifier by the sensor apparatus 1 is associated with power generation of the power generation amount equal to or larger than the predetermined amount. Therefore, transmission of the identifier can be considered as transmission of the power generation information. Thus, the management apparatus 3 which has received the identifier of the module 10a is, for example, capable of recognizing that the solar power generation unit 11a of the module 10a has generated electric power equivalent to an energy amount for performing some of or all operations of the system. Further, information including an identifier specific to the sensor apparatus 1 and information indicating the type of power generation whose transmission has become equal to or larger than the predetermined amount can also be used as the identifier.

That is, the management apparatus 3 is capable of generating information on a power generation amount and frequency of power generation of the power generation unit 11 on the basis of the reception frequency of the power generation information including the identifier transmitted by the sensor apparatus 1 (e.g., the number of times at which this identifier has been received in a predetermined time, reception intervals of the identifier, and the like).

[Example of State Estimated on Basis of Power Generation Information]

Hereinafter, an example of the state of the livestock animal estimated from the power generation information received by the management apparatus 3 will be described with reference to FIGS. 7A, 7B, 7C, and 7D.

FIGS. 7A, 7B, 7C, and 7D are diagrams showing output from sensor apparatuses 1 respectively attached to different livestock animals A1, A2, A3, and A4. In the figure, the bar-like graph schematically show patterns of the number of times of reception of the identifiers of the respective modules. Further, "light" described in the graph indicates the number of times of reception of the identifier of the module 10a including the solar power generation unit 11a, "heat" indicates the number of times of reception of the identifier of the module 10b including the temperature-difference power generation unit 11b, "vibration" indicates the number of times of reception of the identifier of the module 10c including the vibration power generation unit 11c, and "radio waves" indicates the number of times of reception of the identifier of the module 10d including the radio-wave power generation unit 11d.

Note that, as described above, the power generation amount tends to increase as the number of times of reception of the identifier from each module in the predetermined time becomes larger. Thus, in the following description, if the number of times of reception of the identifier from the module is large, the expression "the power generation amount of the power generation unit installed in that module is large" will be used, and if the number of times of reception is small, the expression "the power generation amount is small" will be used.

(Staying Place)

For example, the CPU 31 of the management apparatus 3 is capable of estimating a staying place of a livestock animal on the basis of the power generation information of the solar power generation unit 11a.

Figure 7:
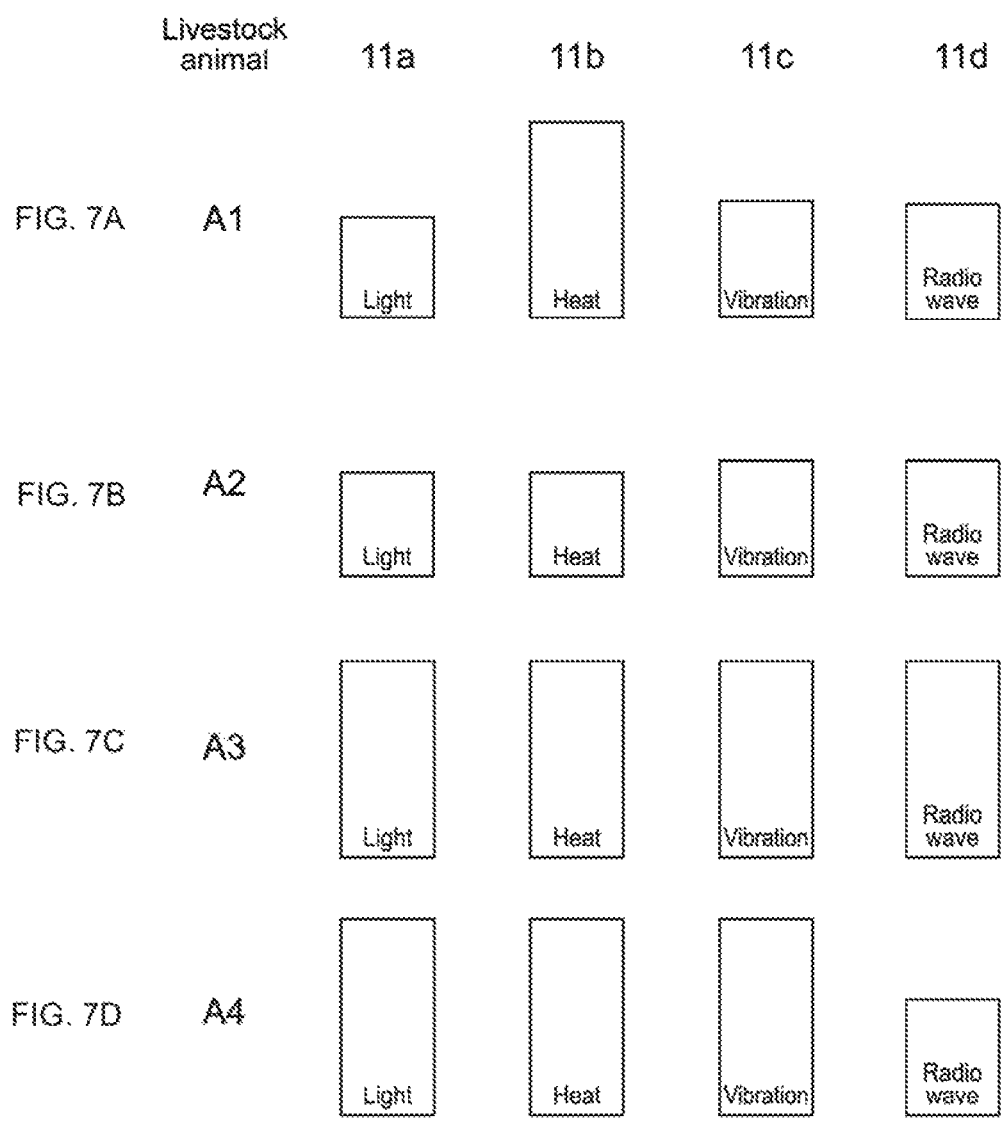
FIGS. 7A, 7B, 7C, and 7D Schematic diagrams showing output from the sensor apparatuses respectively attached to different livestock animals.

Comparing power generation amounts of the solar power generation units 11a in FIG. 7A and FIG. 7B with power generation amounts of the solar power generation units 11a in 7C and FIG. 7D, the power generation amounts of the solar power generation units 11a in the latter are larger. With this, it can be estimated that the livestock animals A3 and A4 have stayed in an outdoor pasture longer than the livestock animals A1 and A2.

Further, a further detailed staying place of a livestock animal can be estimated by using the power generation amount from the radio-wave power generation unit 11d.

For example, comparing a power generation amount from the radio-wave power generation unit 11d in FIG. 7C with a power generation amount from the radio-wave power generation unit 11d in FIG. 7D, it can be estimated that the livestock animal A3 have stayed in a place having more radio waves in comparison with the livestock animal A4. Therefore, if distribution of places having strong radio field intensity and places having weak radio field intensity is formed within the pasture, it becomes possible to also estimate the staying place of the livestock animal in the pasture on the basis of the power generation amount from the radio-wave power generation unit 11d.

(Activity Amount)

For example, the CPU 31 of the management apparatus 3 is capable of estimating an activity amount of the livestock animal on the basis of the power generation information of the vibration power generation unit 11c.

Comparing power generation amounts of the vibration power generation units 11c in FIG. 7A and FIG. 7B with power generation amounts of the vibration power generation units 11c in FIG. 7C and FIG. 7D, the power generation amounts of the vibration power generation units 11c in the latter are larger. With this, it can be estimated that the activity amount of the livestock animals A3 and A4 is larger than that of the livestock animals A1 and A2.

Further, duration of an outdoor staying time can be estimated by using the power generation amount from the solar power generation unit 11a. Typically, it can be considered that livestock animals, which have stayed longer outdoor, actively behave. Therefore, an activity amount of a livestock animal can be indirectly estimated also on the basis of the power generation amount from the solar power generation unit 11a.

In addition, by analyzing the power generation information of the vibration power generation unit 11c for a predetermined period or longer, the states of the livestock animals can also be estimated from variations in the power generation amount. For example, if the power generation amounts of the vibration power generation units 11c are large on an average, it can be estimated that they are a population whose activity amount is large as a whole. On the other hand, if the power generation amounts of the vibration power generation units 11c widely vary, it can be estimated that they have received impacts or have some troubles.

(Behavior of Livestock Animal)

In addition, the CPU 31 is, for example, capable of analyzing a pattern of frequency of power generation and estimating behavior of a livestock animal on the basis of the power generation information of the vibration power generation unit 11c.

For example, regarding a move of an ear and a move of a limb to which the sensor apparatuses 1 are attached, they are different in vibration frequency. Therefore, they are also different in power generation pattern. Thus, their behavior can be identified. Further, if a characteristic power generation pattern can also be found in walking, running, mounting, or the like of livestock animals, their behavior can be estimated.

(Presence/Absence of Fever)

For example, the CPU 31 of the management apparatus 3 is capable of estimating the presence/absence of fever of the livestock animal on the basis of the power generation information of the temperature-difference power generation unit 11b and the solar power generation unit 11a.

Comparing a power generation amount of the temperature-difference power generation unit 11b in FIG. 7A with a power generation amount of the temperature-difference power generation unit 11b in FIG. 7B, the power generation amount of the temperature-difference power generation unit 11b in the former is larger. On the other hand, the power generation amounts of these solar power generation units 11a are substantially the same.

With this, it can be estimated that despite the fact that both of the livestock animals A1 and A2 have stayed indoor for substantially the same time, the livestock animal A1 has a higher body temperature than the livestock animal A2.

Further, by comparing the power generation amounts of the solar power generation units 11a and the temperature-difference power generation units 11b in FIG. 7B with the power generation amounts of the solar power generation units 11a and the temperature-difference power generation units 11b in FIG. 7C, the power generation amounts of both in FIG. 7C are larger.

With this, it can be estimated that, regarding the livestock animal A3, the power generation amount of the temperature-difference power generation unit 11b has increased due to its long stay in a lower-temperature place (e.g., outdoor such as grazing land) in comparison with the livestock animal A2. Therefore, it can be estimated that, regarding the livestock animal A3, the power generation amount of the temperature-difference power generation unit 11b is large but it is unlikely that it has a fever.

In addition, examples of a cause why a livestock animal has a fever can include disease, stress, estrus, and the like. Therefore, such a factor that can be a cause to have a fever can also be estimated by estimating the presence/absence of fever.

(Estrus)

The CPU 31 of the management apparatus 3 is, for example, capable of estimating whether or not a livestock animal is in estrus on the basis of the power generation information. With this, reproductive management very important for livestock management can be made easy.

If a livestock animal is in estrus, the activity amount and body temperature of the livestock animal generally increase. With this, the CPU 31 is capable of estimating whether or not a livestock animal is in estrus on the basis of the power generation information from the vibration power generation unit 11c, the temperature-difference power generation unit 11b, and the like as described above.

(Meat Quality)

For example, the CPU 31 of the management apparatus 3 is capable of estimating meat quality on the basis of the power generation information. With this, the meat quality, which can be checked only after a livestock animal is processed as meat, can be estimated on the basis of a state of a living body. Further, it is possible to perform management for further improving the meat quality in view of the estimated meat quality and to enhance the economic value of the livestock animal.

It is considered that the meat quality of livestock animals generally depends on feed, exercise load, stress, and the like. As described above, the exercise load (activity amount) and stress can be estimated on the basis of the power generation information. Further, regarding the feed, as long as staying places of individual livestock animals can be grasped on the basis of the power generation information from the radio-wave power generation unit 11d and the solar power generation unit 11a, the kinds of grasses and the like eaten by these livestock animals can also be determined.

Thus, it becomes possible for the CPU 31 to estimate the meat quality of individual livestock animals that can be checked typically after they are processed as meat.

In this manner, the management apparatus 3 is capable of estimating various states of the livestock animal on the basis of the power generation information and facilitating stock-breeding management such as grazing.

Hereinafter, specific estimation processing of the management apparatus 3 will be described.

[Operation Example of Management Apparatus]

(Basic Operation Example)

Figure 8:
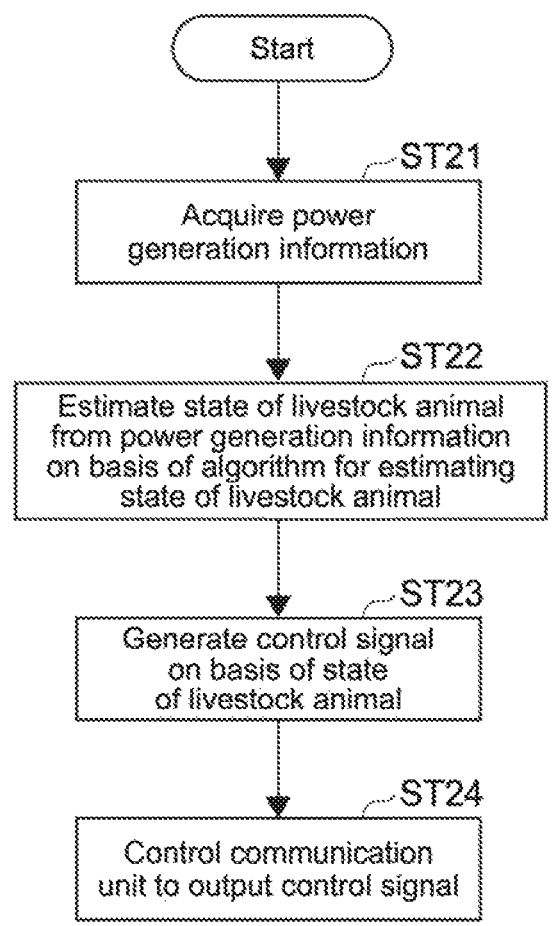
FIG. 8 A flowchart showing a basic operation example of a management apparatus of the livestock management system.

FIG. 8 is a flowchart showing a basic operation example of the management apparatus 3. Note that, in the figure, it is assumed that the operation subject is the CPU 31 of the management apparatus 3.

In this operation example, shown is an example in which the CPU 31 estimates a state of a certain livestock animal by using an algorithm generated by machine learning and generates a control signal to the external apparatus by using the estimation result.

First of all, the CPU 31 acquires power generation information sent from the sensor apparatus 1 attached to the livestock animal (ST21). More specifically, the CPU 31 is capable of acquiring an identifier received by the communication unit 33 via the communication apparatus 2 as the power generation information.

Subsequently, the CPU 31 estimates a state of the livestock animal A from the acquired power generation information in accordance with an algorithm for estimating the state of the livestock animal (ST22).

The algorithm for estimating the state of the livestock animal will be described.

The algorithm according to this embodiment is configured to be capable of estimating the state of the livestock animal on the basis of the power generation information generated by machine learning. This algorithm may be generated by the CPU 31 of the management apparatus 3 or may be generated by another information processing apparatus. This algorithm is stored in the storage unit 32.

Learning data used for generating the above-mentioned algorithm is stored in the livestock management database 321 of the management apparatus 3.

The learning data is a data set formed of sample power generation information acquired from the sensor apparatus 1 attached to a sample livestock animal and sample actual data indicating an actual state of the sample livestock animal.

It is assumed that the sample livestock animal set forth herein refers to a livestock animal that has provided data that becomes a basis for generating the algorithm.

It is assumed that the actual data set forth herein is data indicating the actual state of the livestock animal corresponding to the acquired identifier and the sample actual data is data on the actual state of the sample livestock animal. For example, the actual data can be data on a grade as meat, which is obtained when this livestock animal is processed as meat in an example of meat-quality estimation.

Subsequently, the CPU 31 generates a control signal capable of controlling the external apparatus on the basis of the estimated state of the livestock animal by using the above-mentioned algorithm (ST23).

The external apparatus set forth herein can be, for example, the stockbreeding system 4 shown in FIG. 2.

For example, if an activity amount of a certain livestock animal is smaller than that of another livestock animal, the CPU 31 is capable of generating a control signal including this information. With this, the master monitor apparatus 41 is capable of controlling the gate 42 to prolong an open time of the gate 42 of a stall of a barn to which that livestock animal belongs on the basis of this control signal.

Alternatively, if a staying place of a certain livestock animal in a grazing land is estimated, the CPU 31 is capable of generating a control signal including this information. With this, the master monitor apparatus 41 is capable of controlling the automatic feeder 43 to compound a feed that can compensate for nutrient balance of the livestock animal in view of vegetation or the like of the estimated staying place and supply the feed.

Further, the CPU 31 is also capable of generating a control signal for causing the display unit (display) or the like of the master monitor apparatus 41 to, for example, display identification information of an individual livestock animal, which is determined with an identifier transmitted from the sensor apparatus and an estimated state.

Lastly, the CPU 31 controls the communication unit 33 to transmit the generated control signal (ST24). For example, by transmitting the identifier of the determined livestock animal and the estimated information of that livestock animal to the master monitor apparatus 41, the identifier of the livestock animal and the estimated state of that livestock animal are displayed on the display of the display unit of the master monitor apparatus 41.

In this manner, the management apparatus 3 is capable of acquiring information regarding behavior of the livestock animal and a surrounding environment of the livestock animal from the sensor apparatus 1 and estimating a state such as an activity amount and a health state of the individual livestock animal. With this, power consumption for monitoring can be suppressed. Therefore, it is possible to save troubles in maintenance such as disposal of the sensor apparatus 1, replacement of the battery, and charging.

Further, downsizing of the sensor apparatus 1 is possible. Therefore, a damage risk due to collision between livestock animals or the like can also be lowered. In addition, the possibility of an accident due to accidental ingestion of a battery can also be lowered.

In addition, the CPU 31 of the management apparatus 3 is capable of generating a control signal on the basis of the estimated information. Therefore, it is possible to cause also the stockbreeding system 4 or the like introduced into the stockbreeding facility to execute control conforming to the state of the livestock animal. With this, also a large-scale livestock raiser or a livestock raiser that performs grazing relatively difficult to manage can suitably and easily manage individual livestock animals.

Further, the management apparatus 3 is capable of automatically receiving the power generation information from the plurality of sensor apparatuses 1 and easily acquiring the power generation information from the plurality of sensor apparatuses 1 in a lump. With this, a trouble in manually collecting data for each of the sensor apparatuses 1 can be saved.

In addition, the CPU 31 of the management apparatus 3 is capable of estimating a state of the livestock animal on the basis of the algorithm generated by machine learning. Therefore, the state of the livestock animal can be accurately estimated.

Hereinafter, an operation example in which the estimation accuracy of the algorithm can be further enhanced will be described.

(Algorithm Assessment Example 1)

Figure 9:
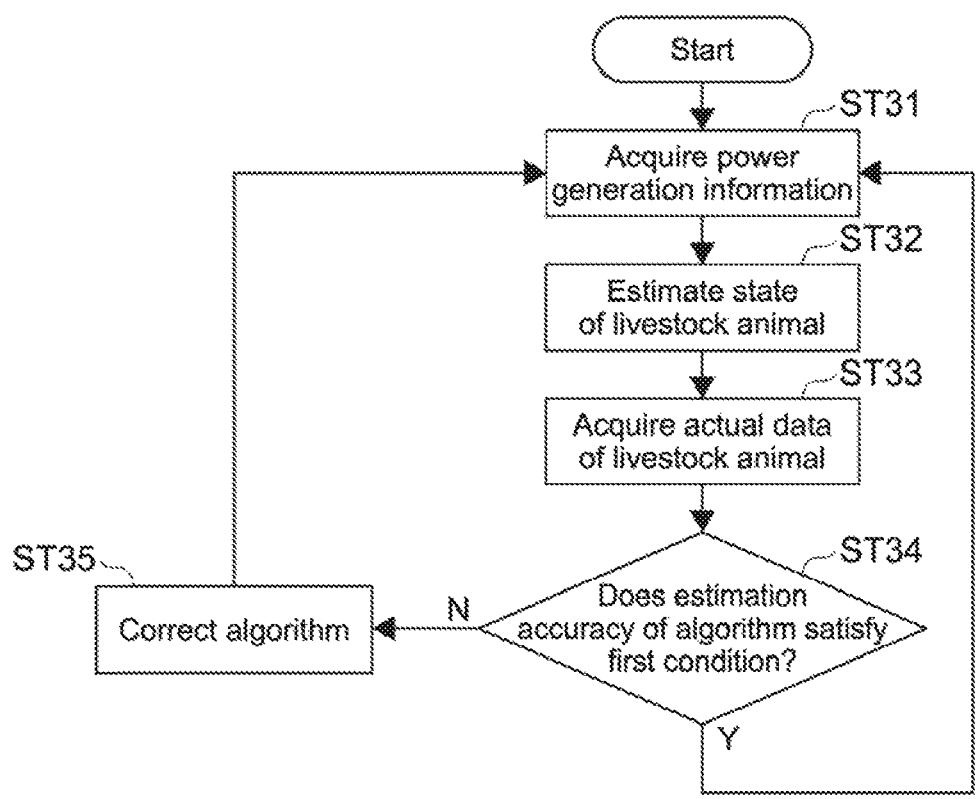
FIG. 9 A flowchart showing an operation example regarding assessment of an algorithm in the management apparatus.

FIG. 9 is a flowchart showing an operation example regarding assessment of an algorithm in the management apparatus 3. Note that, in the figure, it is assumed that the operation subject is the CPU 31 of the management apparatus 3.

In this operation example, shown is an example in which the CPU 31 estimates a state of a certain livestock animal by using the algorithm generated by machine learning and assesses and corrects the algorithm on the basis of actual data of that livestock animal.

First of all, the CPU 31 acquires power generation information sent from the sensor apparatus 1 (first sensor apparatus) attached to the livestock animal A1 (ST31).

Subsequently, the CPU 31 estimates a state of the livestock animal A1 on the basis of the acquired power generation information and the algorithm (ST32). The algorithm can be generated by machine learning using learning data as described above with reference to FIG. 8.

Subsequently, the CPU 31 acquires the actual data indicating the actual state of the livestock animal A1 and causes the storage unit 32 to store it (ST33).

An acquisition method for the actual data by the CPU 31 is not particularly limited. For example, as in ST31, the CPU 31 may control the communication unit 33 to acquire the actual data from an information terminal or the like in which the actual data is stored via the network N or the CPU 31 may acquire the actual data via an external memory or the like connected to the management apparatus 3.

Subsequently, on the basis of the assessment result of the estimated state of the livestock animal A1 with respect to the actual data of the livestock animal A1, the CPU 31 determines whether or not the estimation accuracy of the algorithm satisfies a first condition (ST34).

For example, the first condition can be a condition that a correct answer rate of the estimated state of the livestock animal using the generated algorithm is a correct answer rate equal to or higher than a predetermined level.

It is assumed that the correct answer rate is a rate of the number of correct answers of the estimated state with respect to the total number of livestock animals from which the actual data and the sample actual data have been acquired.

Further, if it is determined that the estimated state of the livestock animal is equivalent to the actual state of that livestock animal in the actual data, the CPU 31 is capable of determining that it is "correct".

Although the correct answer rate equal to or higher than the predetermined level is not particularly limited, it can be a correct answer rate equal to or higher than 95%, for example.

Specifically, in ST34, the CPU 31 determines whether or not the actual data of the livestock animal A1 is equivalent (correct) to the estimated state of the livestock animal A1, and reflects the determination result to the correct answer rate regarding a plurality of livestock animal samples stored as learning data.

If it is determined that the assessment result satisfies the first condition (Y in ST34), the CPU 31 returns to ST31 and repeats the processing with respect to the livestock animal A2 different from the livestock animal A1.

On the other hand, if it is determined that the assessment result does not satisfy the first condition (N in ST34), the CPU 31 corrects the algorithm on the basis of the assessment result between the actual data of the livestock animal A1 and the estimated state of the livestock animal A1 (ST35).

Then, the CPU 31 returns to ST31 and repeats the processing with respect to the livestock animal A2 different from the livestock animal A1. That is, the CPU 31 acquires the power generation information sent from the sensor apparatus 1 (second sensor apparatus) attached to the livestock animal A2 (ST31), and estimates a state of the livestock animal A2 on the basis of the acquired power generation information and the corrected algorithm (ST32). In addition, the CPU 31 makes the processing progress in the same manner as the livestock animal A1 and corrects the algorithm in a manner that depends on needs again.

With this, the CPU 31 is capable of constructing an algorithm having a higher estimation accuracy.

(Algorithm Assessment Example 2)

Figure 10:
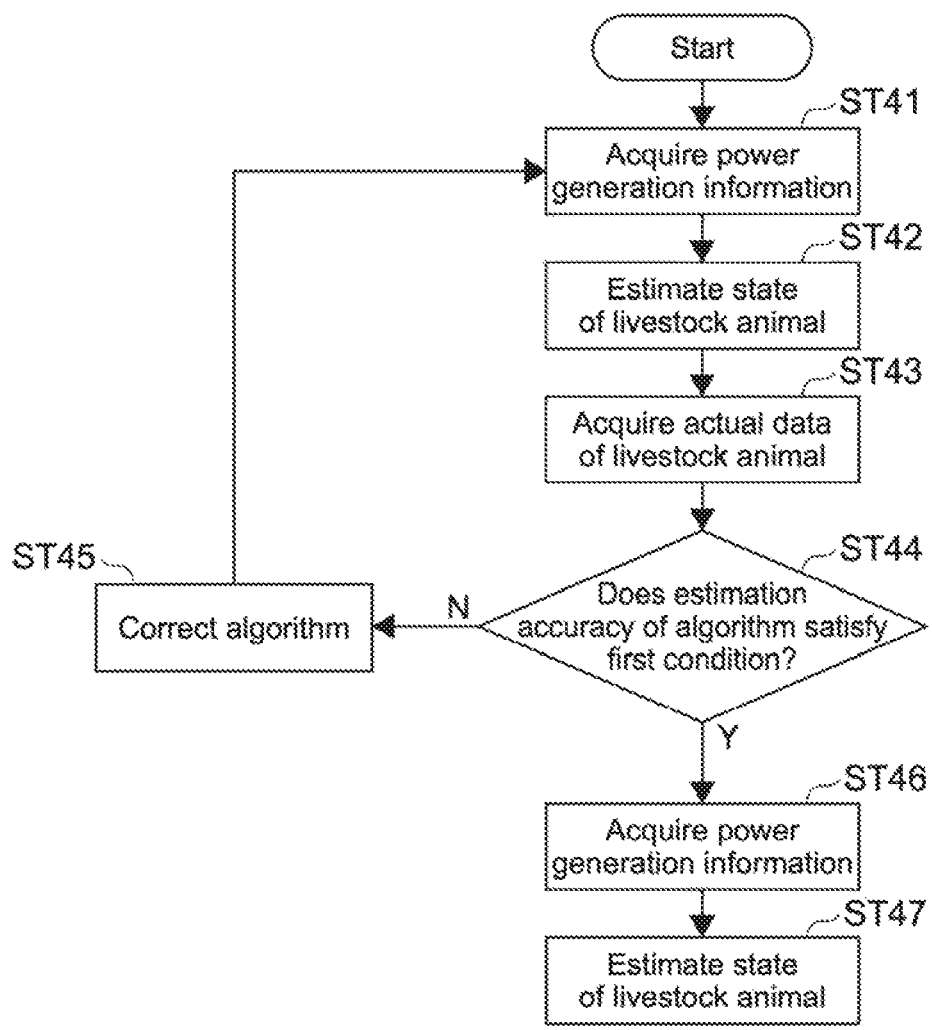
FIG. 10 A flowchart showing another operation example regarding assessment of an algorithm in the management apparatus.

FIG. 10 is a flowchart showing another operation example regarding the assessment of the algorithm of the management apparatus 3. Note that, in the figure, it is assumed that the operation subject is the CPU 31 of the management apparatus 3.

ST41 to ST45 of FIG. 10 are similar to ST31 to ST35 of FIG. 9 respectively. Therefore, descriptions thereof will be omitted. In this operation example, the processing is different in that the assessment is omitted if it is determined in ST44 that the assessment result satisfies the first condition (Y in ST44).

That is, if it is determined that the assessment result satisfies the first condition (Y in ST44), the CPU 31 acquires the power generation information sent from the sensor apparatus 1 (second sensor apparatus) attached to the livestock animal A2 (ST46). The CPU 31 estimates a state of the livestock animal A2 on the basis of the acquired power generation information and the algorithm (ST47), and terminates the processing.

In this manner, in this assessment example, if it is determined that the estimation accuracy of the algorithm satisfies the first condition and the estimation accuracy is good, collection of the power generation information and estimation of the state can be repeated without assessing the estimation accuracy of the algorithm again. With this, the processing can be made rapid and the processing costs can be reduced.

(Algorithm Assessment Example 3)

Figure 11:
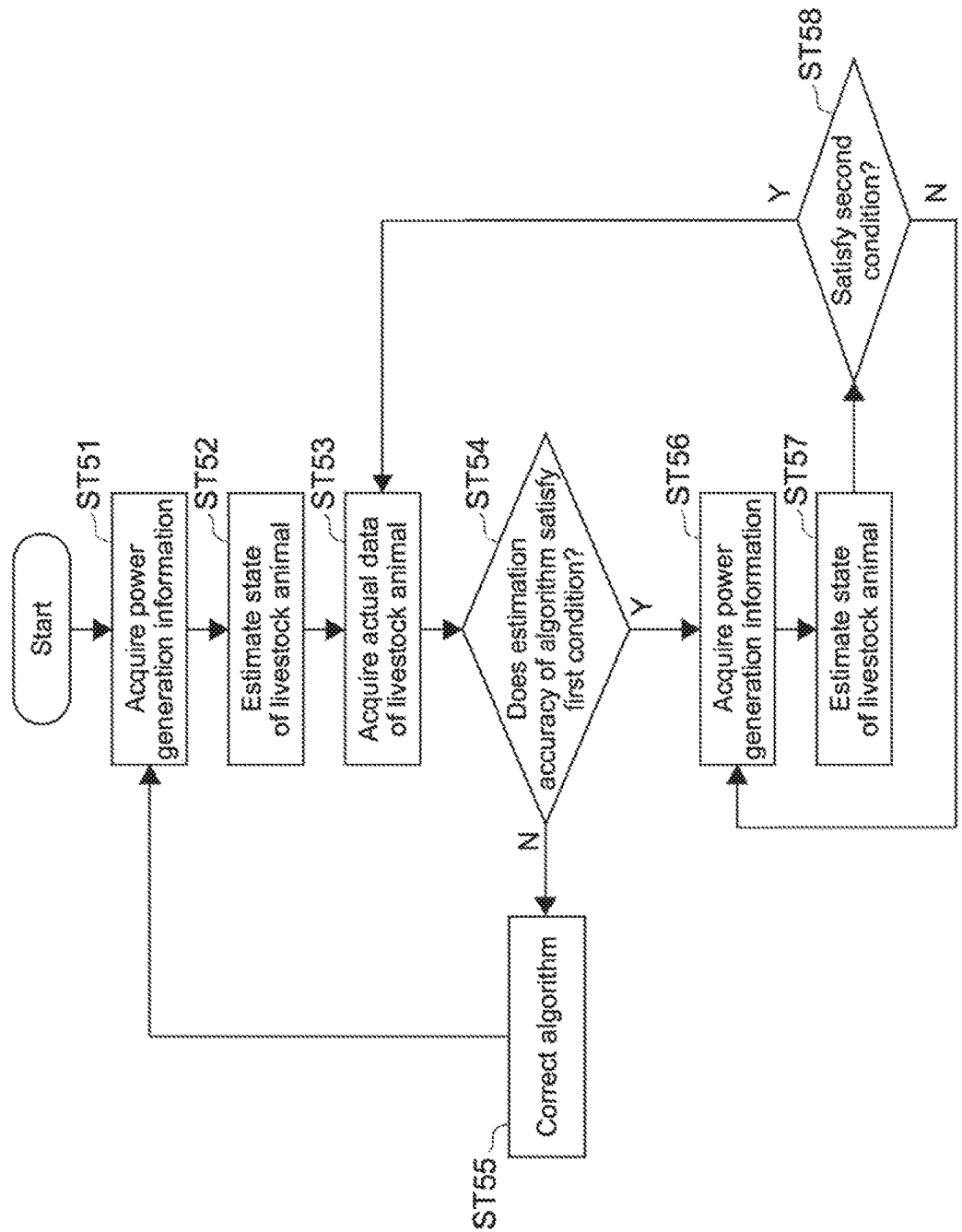
FIG. 11 A flowchart showing another operation example regarding assessment of an algorithm in the management apparatus.

FIG. 11 is a flowchart showing another operation example regarding the assessment of the algorithm of the management apparatus 3. Note that, in the figure, it is assumed that the operation subject is the CPU 31 of the management apparatus 3.

ST51 to ST57 of FIG. 11 are similar to ST41 to ST47 of FIG. 10, respectively. Therefore, descriptions thereof will be omitted. In this operation example, the CPU 31 does not terminate the processing in ST57 and assesses the estimation accuracy of the algorithm again if a predetermined condition is satisfied.

That is, after estimating the state of the livestock animal A2 on the basis of the acquired power generation information and the algorithm in ST56, the CPU 31 determines whether or not a second condition regarding a correction period of the algorithm (ST58).

The second condition can be, for example, a condition including an elapsed period from previous correction of the algorithm, the number of livestock animals whose states have been estimated after previous correction of the algorithm, and the like.

If it is determined that the second condition is satisfied (Y in ST58), the CPU 31 returns to ST53, and acquires the actual data (second actual data) indicating the actual state of the livestock animal A2 and causes the storage unit 32 to store it. Then, the CPU 31 determines whether or not the estimation accuracy of the algorithm satisfies the first condition the assessment result on the basis of the estimated state of the livestock animal A2 with respect to the actual data of the livestock animal A2 (ST54), and repeats the processing.

On the other hand, if it is determined that the second condition is not satisfied (N in ST58), the CPU 31 returns to ST56, and acquires the power generation information regarding the livestock animal A3 different from the livestock animal A2.

In this manner, in this assessment example, the estimation accuracy of the algorithm can be re-assessed at a predetermined timing. Therefore, during a long-term monitoring period, the maintenance of the algorithm can be automatically executed.

[Application Example of Processing Result by Management Apparatus]

The information regarding the estimated state of the livestock animal by the management apparatus 3 can be utilized in the following manner.

(Application Example 1: Generation of API)

In the above-mentioned embodiment, the example in which the CPU 31 generates the control signal for controlling the external apparatus from the estimated state of the livestock animal has been described. However, the estimated state of the livestock animal can be utilized in the following manner.

That is, the CPU 31 may process the data of the estimated state of the livestock animal by using the algorithm and generate an API (Application Programming Interface) utilized by software installed in the external apparatus or the like.

For example, the above-mentioned software can be, for example, a part of a loan amount determination application program or the like for determining a loan amount to the livestock raiser or one that provides the program or the like with data. The estimated state of the livestock animal in this case can be meat quality involved with the loan amount, the health state of the livestock animal, and the like.

The loan amount determination application program can be, for example, installed in an information processing apparatus of a financial institution that lends money to the livestock raiser.

The loan amount determination application program makes it possible to generate a sales forecast algorithm by machine learning using information regarding estimated states of livestock animals and actual data of actual sales or the like of the livestock raiser. The loan amount determination application program makes it possible to forecast sales of a livestock raiser to which a loan amount is to be determined and determining the loan amount on the basis of estimated states of livestock animals in that livestock raiser by using this sales forecast algorithm.

The financial institution is capable of grasping a management state of the livestock raiser on the basis of an estimation result by the management apparatus 3 and determining a suitable loan amount. With this, for example, it is possible to more accurately grasp not only information on the number of livestock animals held by the livestock raiser but also the information on the management state of the livestock raiser, the economic values of the livestock animals, and the like, and to reduce the loan risk.

Further, in addition, on the other hand, also in the livestock raiser, the livestock raiser uses this system. Thus, by using the fact that the livestock animals raised up by the livestock raiser have been proved as being livestock animals truly assessed by the system managed by a third party as a value, the additional value of the livestock animals can be increased. Thus, the livestock raiser can increase the benefits and the financial institution can further reduce the loan risk.

A more specific operation will be described.

First of all, the CPU 31 of the management apparatus 3 acquires an API request from an external apparatus that has installed predetermined software therein. The API request includes, for example, identification information (ID) of the livestock raiser and request data corresponding to request function return data including livestock management information or the like of the livestock raiser, for example.

Subsequently, in response to the API request, the CPU 31 generates information on the basis of livestock activity history information for each livestock animal associated with the livestock raiser's ID. The livestock activity history information for each livestock animal refers to information associated with the identifier of the livestock animal.

Lastly, the CPU 31 transmits the information generated on the basis of the API request, to the external apparatus.

Here, examples of the request function return data includes, besides the livestock management information, one or more pieces of information on forecast farmer sales, a farmer asset value, held average livestock animal meat quality, highest/lowest livestock animal meat quality, and the like.

For example, the livestock activity history information includes one or more pieces of information on an integrated activity amount, an integrated volume-of-sunshine-duration, an integrated heat amount, an integrated radio wave exposure amount, an activity standard score, a sunshine-duration standard score, a heat amount standard score, a radio wave exposure standard score, an integrated amount of movement, an average amount of movement, an amount of movement standard score, a meat quality level (final), a meat quality level (average), a meat quality level (initial), and a meat quality level (highest/lowest), and the like.

Alternatively, the API request may be livestock activity history information for each livestock animal.

In this case, in response to the API request, the CPU 31 generates information on the basis of the livestock activity history information generated from the power generation information associated with the identifier of the livestock animal. The livestock activity history information includes, for example, one or more pieces of information exemplified above.

(Application Example 2: Determination and Notification of Livestock Animal in Predetermined State)

For example, the CPU 31 may be configured to estimate a state of each of a plurality of livestock animals on the basis of power generation information and determine a livestock animal of these plurality of livestock animals, which is in a predetermined state.

For example, the CPU 31 is capable of estimating whether or not each of the plurality of livestock animals is in estrus on the basis of the power generation information and determining the livestock animal estimated as one being in estrus. In this case, the CPU 31 is capable of determining the livestock animal by using an acquired identifier of the module of the sensor apparatus.

In addition, the CPU 31 is capable of generating a control signal including information on the determined livestock animal and the identification information of this livestock animal. With this control signal, it is possible to notify a user of the livestock raiser or the like of the livestock animal in the predetermined state.

In this case, the external apparatus to which the control signal is sent can be a notification apparatus that notifies the information on the determined livestock animal.

Figure 12:
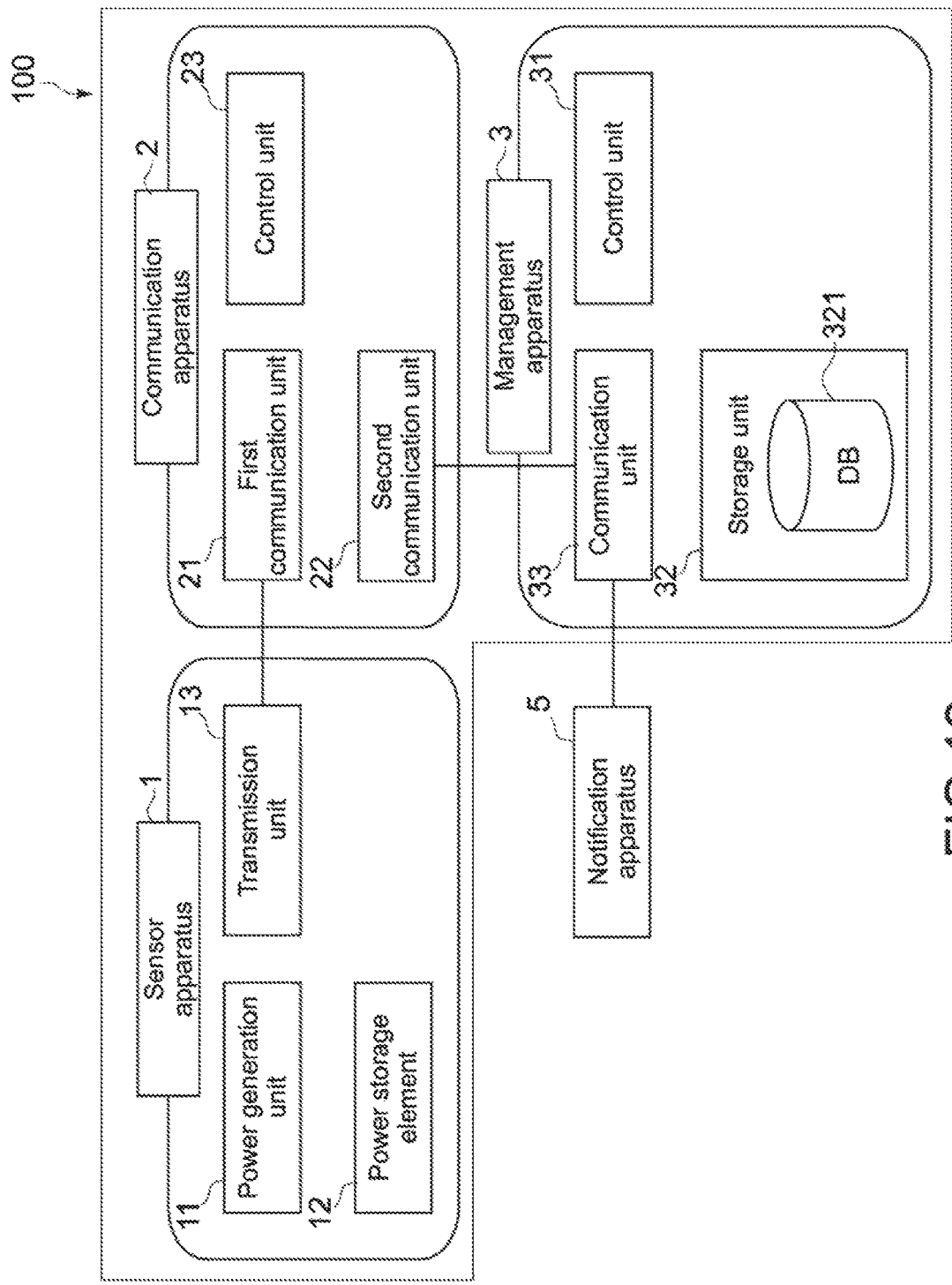
FIG. 12 A block diagram showing a configuration of an application example according to the livestock management system.

FIG. 12 is a block diagram showing a configuration of this application example.

A notification apparatus 5 may be, for example, an information processing apparatus such as a smartphone, a tablet terminal, and a PC connectable to the management apparatus 3 via the network N and the like. These information processing apparatuses are capable of notifying the livestock raiser (user) of the information on the determined livestock animal through displaying by the display device or with sound from the speaker, for example.

Alternatively, the notification apparatus 5 may be the master monitor apparatus 41 of the stockbreeding system 4.

Although a specific notification method is not limited, for example, notification of the ID of the livestock animal may be performed through the display device or the speaker. Alternatively, if the position of the livestock animal can be determined as will be described later, notification of this position may be performed. With this, the user can search for the determined livestock animal via the above-mentioned information terminal.

The timing of notification by the notification apparatus 5 is not particularly limited. For example, the notification apparatus 5 may be configured to automatically start notification after receiving a control signal from the management apparatus 3 or may be configured to start notification through a predetermined input operation of the user.

As an example of the latter case, for example, the user moves a portable information processing terminal as the notification apparatus 5 closer to the above-mentioned communication device and makes a predetermined input operation. The portable information processing terminal can thus receive a control signal and start notification.

Further, the notification apparatus 5 is not limited to the configuration in which it directly communicates with the management apparatus 3, and may be capable of communicating with the management apparatus 3 via the communication device. The "communication device" may be the above-mentioned communication apparatus 2 or may be another communication device.

The notification apparatus 5 is not limited to the information processing apparatus.

For example, the notification apparatus 5 may be configured to be attachable to each livestock animal. The notification apparatus 5 may be attached to the sensor apparatus 1 or may be realized by the sensor apparatus 1 itself. Alternatively, the notification apparatus 5 may be attached to an individual identification tag attached to a livestock animal.

The notification apparatus 5 includes, for example, a display unit such as an LED (Light Emitting Diode). With this, by searching for a livestock animal with a lighting display unit of the notification apparatus 5, the user can determine the livestock animal in estrus, for example.

Alternatively, the notification apparatus 5 may be a mobile object that moves to the vicinity of each livestock animal. In this case, as shown in Modified Example 1-3, the control signal may include, besides the information on the livestock animal in the predetermined state, information regarding the position of that livestock animal.

The mobile object may be an aircraft or may be a traveling object that travels on the ground. Further, these mobile objects may be configured to be capable of independently flying or independently traveling.

The above-mentioned mobile object is capable of guiding the user to a targeted livestock animal in a predetermined state. Alternatively, it is also possible to guide the user with the mobile object that has moved to the vicinity of the livestock animal being a mark indicating the position of the livestock animal.

(Application Example 3: Example of External Apparatus)

The above-mentioned external apparatus is not limited to the master monitor apparatus 41 of the stockbreeding system 4 or the notification apparatus 5, and may be, for example, an individual device that constitutes the stockbreeding system 4.

Alternatively, the external apparatus may be an information terminal such as a smartphone, a tablet terminal, and a PC connectable to the management apparatus 3 via the network N. With this, the state estimation result of the livestock animal can be presented to the user utilizing the information terminal.

[Modified Example]

Hereinafter, a modified example of this embodiment will be described.

(Modified Example 1-1: Estimation of Plurality of States)

The CPU 31 may estimate a plurality of states for grasping an environment and a health state of the livestock animal from more perspectives. Examples of the plurality of states can include a staying place, an activity amount, frequency of body temperature abnormality, and meat quality of each livestock animal, and whether or not each livestock animal is in estrus.

For example, the CPU 31 is also capable of estimating each of these plurality of states through another processing.

Alternatively, in a case of estimating a plurality of states having a correlation, the CPU 31 is also capable of estimating, as shown in the following, a first state on the basis of the power generation information and then estimating a second state different from the first state on the basis of the first state. Examples of the plurality of states having a correlation can include activity amount and meat quality, stress and meat quality, and stress and milk yield. Hereinafter, a description will be made assuming that the "first state" is the "activity amount" and the "second state" is the "meat quality".

Figure 13:
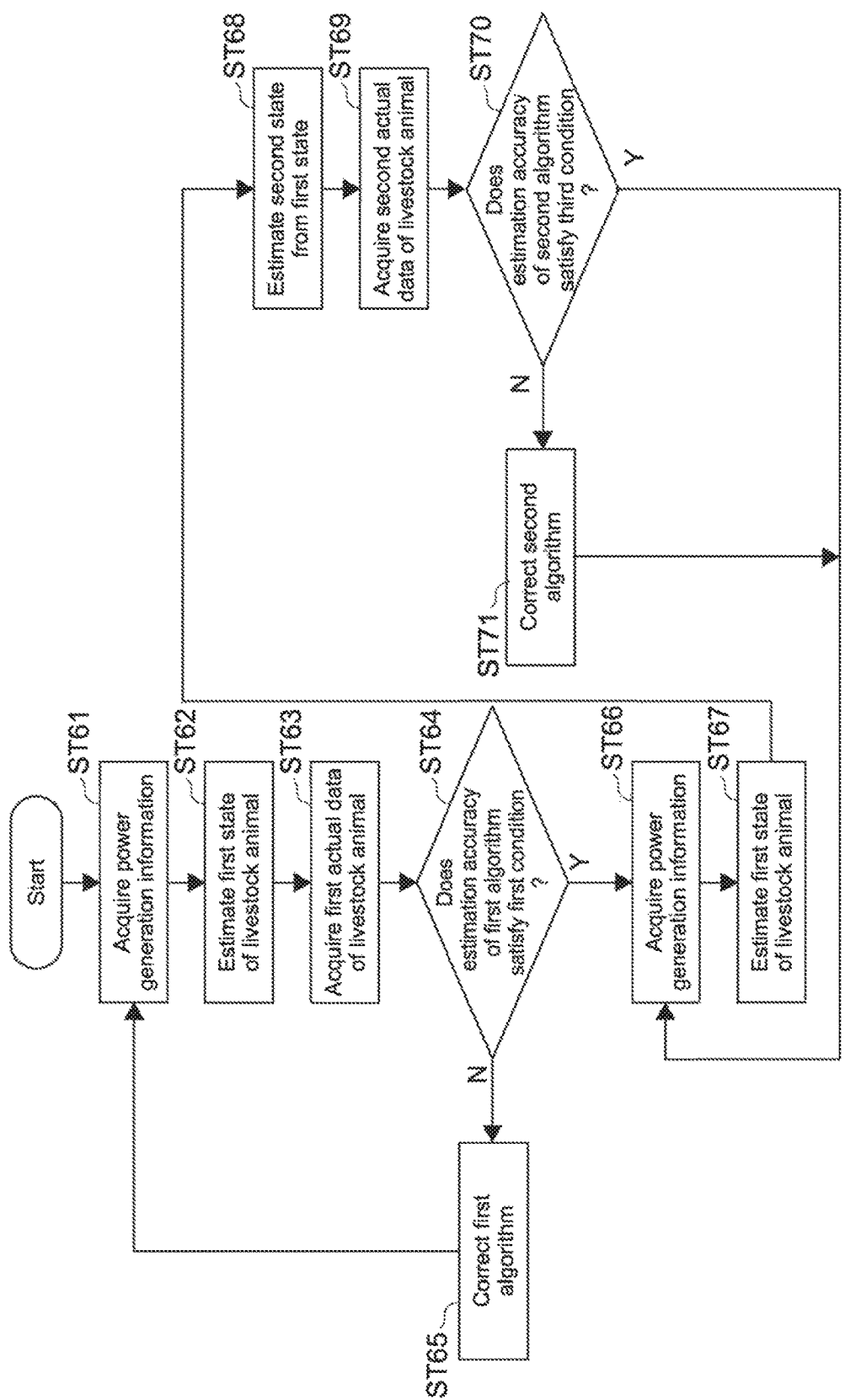
FIG. 13 A flowchart showing an operation example regarding assessment of an algorithm of the management server according to Modified Example 1-1.

FIG. 13 is a flowchart showing another operation example regarding the assessment of the algorithm of the management apparatus 3. Note that, in the figure, it is assumed that the operation subject is the CPU 31 of the management apparatus 3.

ST61 to ST67 of FIG. 13 are similar to ST41 to ST47 of FIG. 10, respectively.

That is, the CPU 31 acquires power generation information sent from the sensor apparatus 1 (first sensor apparatus) attached to the livestock animal A1 (ST61). Subsequently, the CPU 31 estimates an activity amount (first state) of the livestock animal A1 on the basis of the acquired power generation information and an algorithm (first algorithm) for estimating the activity amount (ST62).

Subsequently, the CPU 31 acquires actual data (first actual data) indicating an actual activity amount of the livestock animal A1 and causes the storage unit 32 to store it (ST63).

Subsequently, the CPU 31 determines whether or not the estimation accuracy of the first algorithm satisfies the first condition on the basis of the assessment result of the estimated activity amount of the livestock animal A1 with respect to the actual data of the livestock animal A1 (ST64).

On the other hand, if it is determined that the assessment result does not satisfy the first condition (N in ST64), the CPU 31 corrects the first algorithm on the basis of the assessment result between the actual data of the livestock animal A1 and the estimated activity amount of the livestock animal A1 (ST65).

Then, the CPU 31 returns to ST61 and repeats the processing with respect to the livestock animal A2 different from the livestock animal A1.

If it is determined that the assessment result satisfies the first condition (Y in ST64), the CPU 31 acquires power generation information sent from the sensor apparatus 1 (second sensor apparatus) attached to the livestock animal A2 (ST66), and estimates the activity amount (first state) of the livestock animal A2 on the basis of the acquired power generation information and the first algorithm (ST67).

Subsequently, the CPU 31 estimates the meat quality of the livestock animal on the basis of the algorithm (second algorithm) for estimating the meat quality of the livestock animal (second state) from the estimated activity amount (first state) (ST68).

Subsequently, the CPU 31 acquires the actual data (second actual data) indicating actual meat quality of the livestock animal A2 and causes the storage unit 32 to store it (ST69).

Subsequently, the CPU 31 determines whether or not the estimation accuracy of the second algorithm satisfies a third condition on the basis of the assessment result of the meat quality of the estimated livestock animal A2 with respect to the actual data of the livestock animal A2 (ST70).

As in the first condition, the third condition can be a condition that the correct answer rate of the estimated meat quality of the livestock animal is a correct answer rate equal to or higher than a predetermined level with the generated second algorithm.

If it is determined that the assessment result satisfies the third condition (Y in ST70), the CPU 31 returns to ST66 and repeats the processing with respect to the livestock animal A3 different from the livestock animal A2.

On the other hand, if it is determined that the assessment result does not satisfy the third condition (N in ST70), the CPU 31 corrects the second algorithm on the basis of the assessment result between the actual data of the livestock animal A2 and the meat quality of the estimated livestock animal A2 (ST71).

Then, the CPU 31 returns to ST66 and repeats the processing by using the corrected second algorithm with respect to the livestock animal A3 different from the livestock animal A2.

As described above, in accordance with this operation example, both of the first state and the second state can be accurately estimated.

(Modified Example 1-2: Chronological Estimation of State of Livestock Animal)

By chronologically processing the estimated state of each livestock animal, the CPU 31 is capable of estimating a state of each livestock animal within a predetermined period.

For example, the CPU 31 is capable of calculating a grazing time by integrating a time for which a certain livestock animal was continuously staying in the grazing land. Further, by integrating a time for which the activity amount is relatively large, an exercise time can be calculated. In addition, the CPU 31 may generate, for example, data on an average value of the grazing time or exercise time per day, a maximum value, a minimum value, a total value in a predetermined period, and the like.

Further, for example, the CPU 31 is capable of generating data on frequency of body temperature abnormality, mastication frequency in a predetermined time, and the like.

For example, the sensor apparatus 1 may transmit time information associated with the power generation information as well as the power generation information. In this case, the module of the sensor apparatus 1 can be configured in the following manner.

Figure 14:
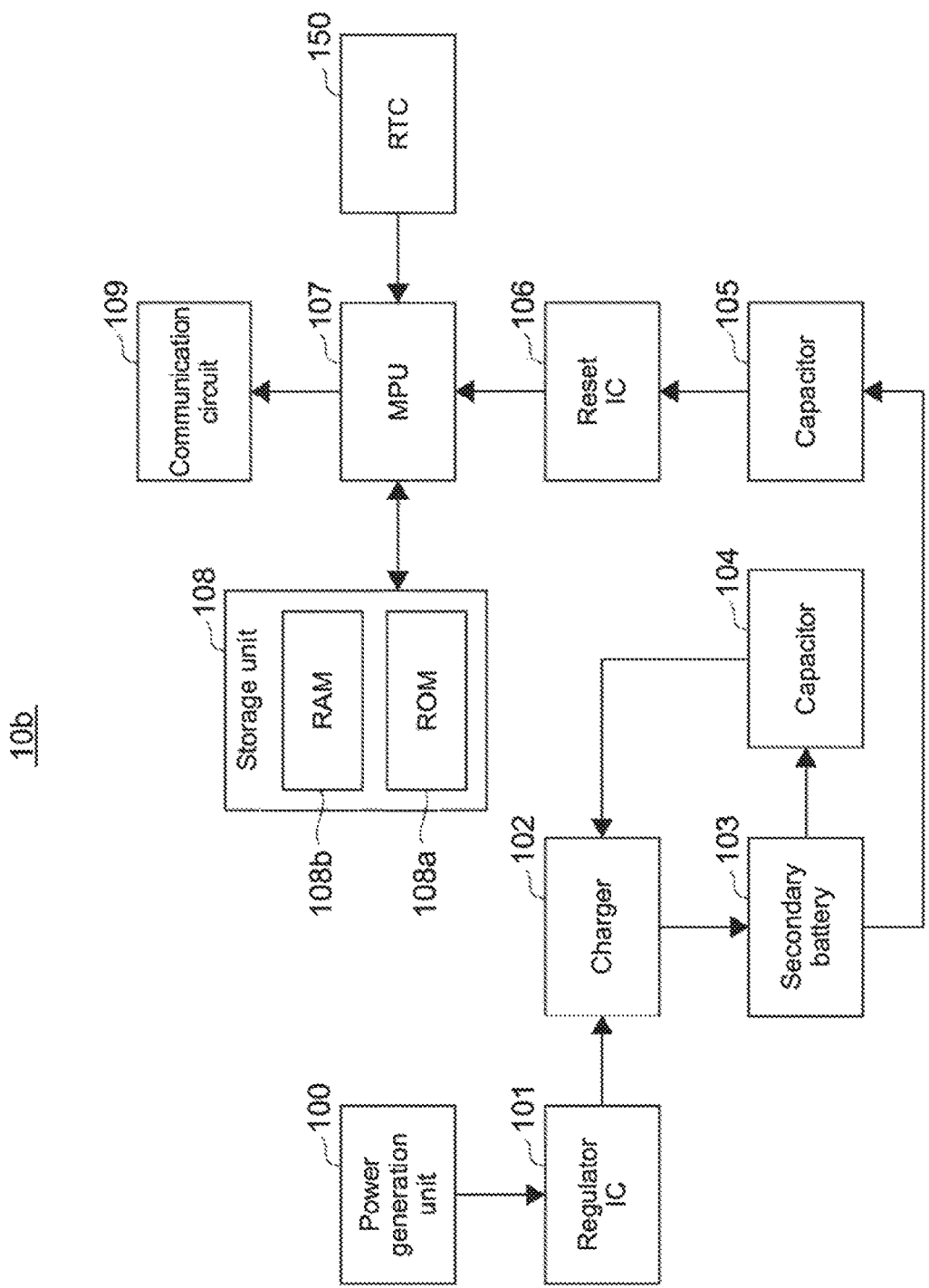
FIG. 14 A diagram showing an example of specific configuration of a module of the sensor apparatus according to Modified Example 1-2.

FIG. 14 is a diagram showing an example of a specific configuration of the module 10*b* of the sensor apparatus 1.

As in the above-mentioned module 10*a*, the module 10*b* has a configuration including, for example, a power generation unit 11*b*, a regulator IC 101, a charger 102, a secondary battery 103, a capacitor 104, a capacitor 105, a reset IC 106, an MPU 107, a storage unit 108, and a communication circuit 109. The storage unit 108 has a configuration including, for example, a ROM 108*a* and a RAM 108*b*.

Note that, as described above, the sensor apparatus 1 includes the module 10*a*, the module 10*b*, the module 10*c*, and the module 10*d*. The respective modules each include the above-mentioned power generation unit 11, a power storage element 12, and a transmission unit 13. Here, the module 10*b* will be taken as an example. Although configurations of other modules in the sensor apparatus 1 are similar to the configuration of the module 10*b*, for example, there may be configuration differences depending on the modules.

In addition, the module 10*b* includes an RTC (Real Time Clock) 150. The RTC 150 is connected to the MPU 107 and supplies the MPU 107 with time information. The time information can be appropriately set as year/month/day, or the like. The MPU 107 may be a configuration incorporating the RTC.

Note that, although the illustration is omitted, the sensor apparatus 1 may be provided with a power supply unit for driving the RTC 150. The power supply unit is, for example, a secondary battery or a primary battery such as a lithium ion battery. The RTC 150 consumes little electric power. Therefore, a small battery such as a coin type battery may be used. Alternatively, electric power stored in the secondary battery 103 may be supplied to the RTC 150. The MPU 107 supplies, correspondingly to switching of the reset IC 106 from the off-state to the on-state, the communication circuit 109 with the time information supplied from the RTC 150 together with the identifier of the module 10*b*. The communication circuit 109 transmits the identifier and the time information of the module 10*b* to the external apparatus via the communication.

If the sensor apparatus 1 is not transmitted, the control unit 23 of the communication apparatus 2 or the CPU 31 of the management apparatus 3 may associate the time information with the received power generation information. Specifically, the control unit 23 or the CPU 31 of the communication apparatus 2 may include the RTC. Also with this, the control unit 23 of the communication apparatus 2 or the CPU 31 is capable of estimating a chronological state of each livestock animal.

(Modified Example 1-3: Acquisition of Information Regarding Position)

The CPU 31 may acquire the information regarding the position of the sensor apparatus 1 on the basis of transmission of the sensor apparatus 1. The information regarding the position set forth herein includes information on at least one of a distance from a reference position of the sensor apparatus 1 and a direction as viewed from the reference position of the sensor apparatus 1. The reference position can be a position of the communication apparatus 2, for example.

Note that, in this modified example, the communication apparatus 2 may include a CPU and the like (not shown). With this, the communication apparatus 2 is capable of generating information regarding the position of the sensor apparatus 1 with the position of the communication apparatus 2 being a reference. The communication apparatus 2 is capable of performing processing of associating this information with the power generation information sent from the sensor apparatus 1.

An acquisition method for the information regarding the position by the CPU 31 is not particularly limited.

For example, it is known that there is a correlation between a signal strength of communication data and a communication distance. In view of this, the communication apparatus 2 is capable of transmitting information regarding the signal strength from the sensor apparatus 1 to the management apparatus 3 together with the power generation information. Specifically, when transmitting the information on the received identifier, the communication apparatus 2 is capable of transmitting this information in association with the information regarding the signal strength. With this, the CPU 31 is capable of acquiring the information regarding the distance of the sensor apparatus 1 from the communication apparatus 2.

Alternatively, the first communication unit 21 of the communication apparatus 2 includes an antenna. By mechanically or electrically changing the directivity of the antenna, the communication apparatus 2 is capable of acquiring information regarding a direction of each sensor apparatus 1 as viewed from the communication apparatus 2 and transmitting it to the management apparatus 3.

Further, the sensor apparatus 1 may include a GPS communication unit (not shown) such that it can transmit position information. In this case, the sensor apparatus 1 may be provided with a power supply unit for driving the GPS communication unit.

(Modified Example 1-4: Modified Example of Sensor Apparatus)

The configuration of the sensor apparatus 1 is not limited to the above-mentioned configuration and can employ various configurations.

For example, the sensor apparatus 1 is not limited to the configuration including all the modules 10*a* to 10*d* and may be a configuration in which it includes at least one of these modules. Further, the sensor apparatus 1 may include a module including a power generation unit 11 having a configuration other than those of the above-mentioned power generation units 11*a* to 11*d*.

For example, the sensor apparatus 1 may include a main communication circuit to be connected to the communication circuit of each of the modules 10*a* to 10*d*. In this case, the main communication circuit functions as a part of the "transmission unit".

For example, a plurality of modules of the respective modules 10*a* to 10*d* may share the communication circuit.

In addition, a configuration not including all or some of the regulator IC 101, the charger 102, the secondary battery 103, the capacitor 104, and the capacitor 105 may be employed in a manner that depends on needs.

For example, a configuration in which the MPU 107 has the function of the reset IC 106 may be employed. In this case, the MPU 107 functions as a part of the "transmission unit".

Alternatively, the transmission unit 13 may be constituted of not the reset IC 106 but a switch with which a conduction state can be changed by switching of a contact, for example. For example, the switch may include bi-metal deformable due to thermal energy.

In this example, the sensor apparatus 1 may include a heat storage element that stores thermal energy and provides it to the power generation unit 11 and the bi-metal.

For example, the power generation unit 11 converts thermal energy into electric energy. The bi-metal is deformed due to thermal expansion and is brought into contact with the contact. With this, conduction between the power generation unit 11 and the MPU 107 is established via this switch, and the power generation information can be transmitted.

Alternatively, the sensor apparatus 1 may include a force storage element in which switching between a storage state and a release state of kinetic energy can be performed. There can be a spiral spring as an example of the force storage element.

The power generation unit 11 is connected to the force storage element and includes a mechanism that performs power generation using electromagnetic induction. Specifically, the power generation unit 11 includes, for example, a magnet and a coil and is configured such that the magnet can be displaced with respect to the coil. With this, the power generation unit 11 is capable of driving the magnet in a manner that depends on kinetic energy supplied from the force storage element and performing power generation.

The sensor apparatus 1 is capable of transmitting the power generation information in such a manner that the MPU 107 is actuated with electric energy generated by the power generation unit 11.

Further, the sensor apparatus 1 including the solar power generation unit 11*a*, the temperature-difference power generation unit 11*b*, the vibration power generation unit 11*c*, and the radio-wave power generation unit 11*d* has been described above with reference to FIG. 4, a device other than them may be installed as the sensor 1. For example, one or more of various sensors including an acceleration sensor, a gyro sensor, a geomagnetic sensor, a temperature sensor that measures a body temperature of the livestock animal to which the sensor apparatus 1 is attached and an ambient temperature of the sensor apparatus 1, a pulse sensor, and the like may be installed in the apparatus 1. Further, a configuration in which these sensors are driven on the basis of electric power generated by the above-mentioned power generation unit may be employed. The transmission unit 13 of the sensor apparatus 1 may transmit information obtained from these sensors together with the power generation information to the communication apparatus 2 and the management apparatus 3. In addition, the management apparatus 3 may receive the information transmitted by these sensors of the sensor apparatus 1 through the communication unit 33 and use it for estimating the state of the livestock animal in ST22 of FIG. 8 or the like.

(Modified Example 1-5: Modified Example about Estimation Method)

Although the algorithm generated by machine learning is used for state estimation by the CPU 31 in the above-mentioned embodiment, it is not limited thereto.

For example, the CPU 31 may estimate a state of the livestock animal on the basis of a predetermined algorithm capable of analyzing the state of the livestock animal on the basis of the power generation information.

An operation example of this modified example will be described.

The CPU 31 which has acquired the power generation information generates secondary information regarding the state of the livestock animal from the power generation information. This secondary information is information for estimating a state of the livestock animal as described above with reference to FIGS. 7A, 7B, 7C, and 7D, for example. For example, it may be one obtained by quantifying the power generation amount of each power generation unit such as the solar power generation unit, a time differential value of the quantified power generation amount, or the like. More specifically, the information obtained by quantifying the power generation amount can be calculated on the basis of reception frequency (i.e., duration of reception intervals) of the power generation information received by the CPU 31 from the identical sensor apparatus 1. Alternatively, the management apparatus 3 may receive information obtained by quantifying power generation amount from the sensor apparatus 1 and the CPU 31 may generate secondary information such as a time differential value of the power generation amount by utilizing this information.

Subsequently, the CPU 31 compares the secondary information with indication data that becomes an indication of the state to be estimated. This indication data can be a predetermined reference value, for example, if the secondary information is quantified information. Alternatively, the indication data can be a statistical value such as an average value of the power generation amount to be described later.

Subsequently, the CPU 31 estimates a state of the livestock animal on the basis of the comparison result.

After that, the CPU 31 is capable of generating a control signal for controlling the external apparatus on the basis of the estimated state of the livestock animal and transmitting this control signal to the external apparatus.

An example of more specific processing will be described.

For example, the CPU 31 is capable of chronologically calculating a differential value (secondary information) of the power generation amount of the solar power generation unit 11*a* and determining a timing at which this differential value becomes equal to or larger than a predetermined value (indication data) as a timing of movement between an indoor place (barn) and an outdoor place (grazing land). With this, the CPU 31 is also capable of setting a time from a time at which this differential value becomes a positive value having a large absolute value to a time at which this differential value becomes a negative value having a large absolute value, as the grazing time.

Figure 15:
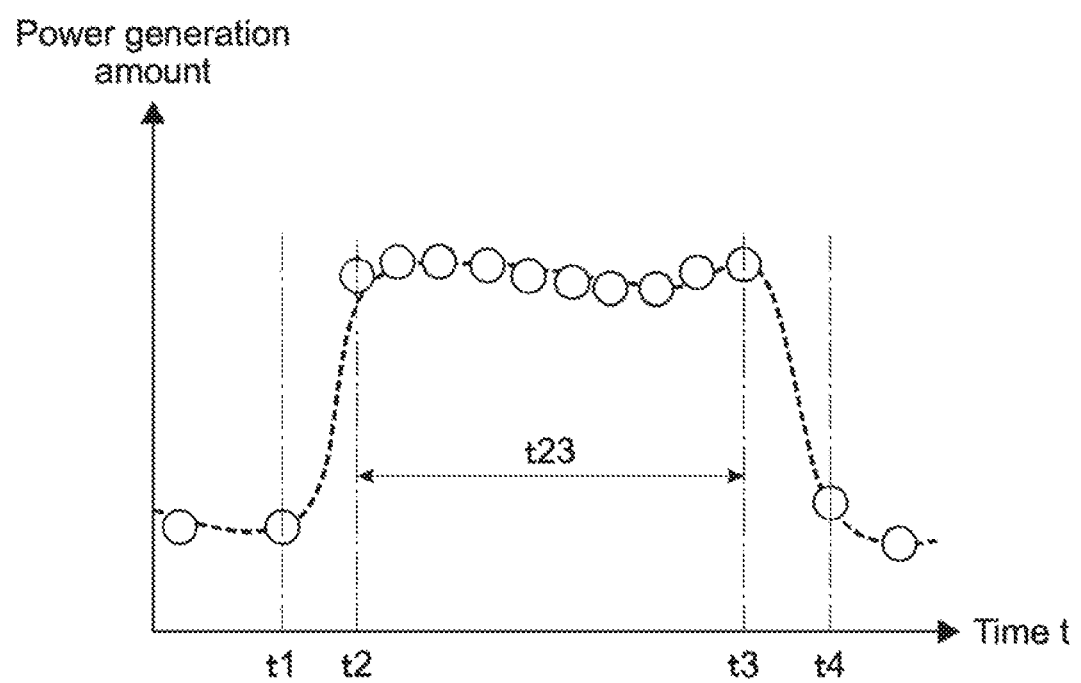
FIG. 15 A graph for describing an example of processing using a solar power generator according to Modified Example 1-5.

FIG. 15 is a graph for describing an example of processing using the solar power generation unit 11a (solar power generator) according to Modified Example 1-5, where the horizontal axis schematically indicates time and the vertical axis schematically indicates the power generation amount of the solar power generation unit 11a.

The CPU 31 calculates a time differential value of the power generation amount at each time. In the example shown in the figure, the power generation amount sharply increases between a time t1 and a time t2, and the CPU 31 determines that this differential value between the times t1 to t2 is equal to or larger than a positive first differential value (equal to or larger than zero). Further, the power generation amount sharply decreases between a time t3 and a time t4, and the CPU 31 determines that this differential value between the times t3 to t4 is equal to or smaller than a negative second differential value (smaller than zero). Further, the CPU 31 determines that this differential value between the times t2 to t3 is larger than the second differential value and smaller than the first differential value. Then, the CPU 31 is capable of estimating a time t23 from the time t2 at which the time differential value equal to or larger than the first differential value becomes smaller than the first differential value to the time t3 at which the time differential value becomes equal to or smaller than the second differential value from the value larger than the second differential value, as a time for which the livestock animal was staying outdoor, that is, the grazing time.

Note that, in the example of FIG. 15, it can be seen that the CPU 31 has quantified the power generation amount on the basis of the reception frequency of the power generation information, that is, the duration of the reception intervals and has frequently received the power generation information during t23 for which the power generation amount is large.

Further, the CPU 31 is capable of estimating weather and the like by also calculating an integrated value (secondary information) of the power generation amount of the solar power generation unit 11a during a time for which grazing was being performed.

Further, if the storage unit 32 stores an absorption wavelength profile of the solar power generation unit 11a, the CPU 31 is also capable of calculating a ultraviolet ray absorption amount and the like of the livestock animal.

Alternatively, the CPU 31 is capable of estimating a state of the livestock animal to which this sensor apparatus 1 is attached, by comparing a statistical value (relative indication data) of power generation amount from the plurality of sensor apparatuses 1 belonging to the same management range (e.g., same region/farm/grazing land/cattleshed) with power generation information from one sensor apparatus 1.

Figure 16:
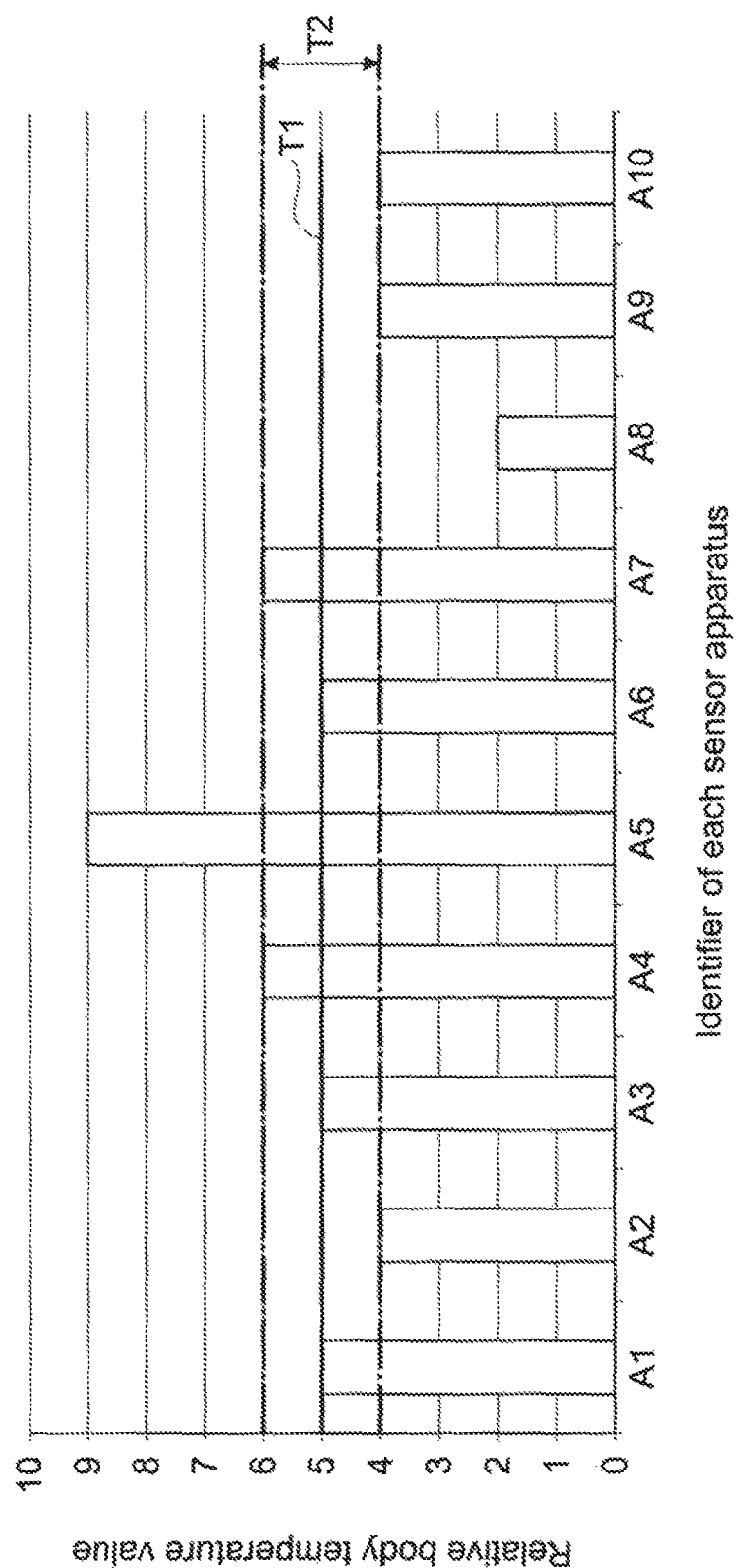
FIG. 16 A graph for describing an example of processing using a temperature-difference power generator according to Modified Example 1-5.

FIG. 16 is a graph showing an example of processing using the temperature-difference power generation unit 11b (temperature-difference power generator) according to Modified Example 1-5, where the horizontal axis indicates identifiers A1 to A10 of ten different sensor apparatuses 1 and the vertical axis indicates a relative body temperature value detected by the temperature-difference power generation unit 11b. In this example, it is assumed that the secondary information is a relative body temperature value calculated by the CPU 31 on the basis of the reception intervals of the power generation information.

In the example shown in FIG. 16, an average value of body temperature values of A1 to A10 is defined as T1 (e.g., relative body temperature value is 5) and a normal range having the average value as a reference is defined as T2 (e.g., relative body temperature value is 4 to 6). At this time, it is assumed that the relative indication data is a normal range T2. T2 that is the normal range can be defined as, for example, a range of the average value +/−20%.

The CPU 31 compares the normal range T2 that is the relative indication data with the power generation information (data on the body temperature value) of each livestock animal. Specifically, the CPU 31 estimates a state of that livestock animal, considering that the livestock animal whose body temperature value is detected as one departing from the normal range T2 is in estrus in which the body temperature is higher than usual or has hypothermia or the like which makes the body temperature lower than usual. In the example shown in the figure, the body temperature value of A5 is eight which is higher than the upper limit of the normal range T2. Thus, the CPU 31 is capable of estimating that, for example, the livestock animal corresponding to A5 is in estrus. Further, the body temperature value of A8 is two which is lower than the lower limit of the normal range. Thus, the CPU 31 is capable of estimating that, for example, the livestock animal corresponding to A8 has hypothermia.

As another example, if determining that, with respect to a certain livestock animal, the value (secondary information) corresponding to the power generation amount of the temperature-difference power generation unit 11b is from the average value to a predetermined value (indication data) or more, the value (secondary information) corresponding to the power generation amount of the vibration power generation unit 11c is equal to or larger than the average value (indication data), and the value (secondary information) corresponding to the power generation amount of the solar power generation unit 11a is a value (indication data) within a predetermined range including the average value, the CPU 31 is capable of estimating that this livestock animal is in estrus. For example, even if the body temperature of the livestock animal is constant, the power generation amount of the temperature-difference power generation changes when the ambient temperature changes. However, an individual whose body temperature is higher or lower than that of other average individuals can be determined by comparing information on the average value of the power generation amounts of the plurality of sensor apparatuses 1 within the same management range (e.g., several hundreds, several thousands of livestock animals in the entire farm) with information on the power generation amount of the sensor apparatus 1 of the individual.

Further, these algorithms and the algorithm generated by machine learning may be combined.

Further, a state of the livestock animal may be estimated by also using information other than the information from the sensor apparatus. For example, it is possible to use temperature information of the pasture, volume-of-sunshine-duration information, weather information, rain-fall information, and the like in the past, present, and future.

Here, for example, in a case of comparing a power generation amount based on vibration power generation with a predetermined threshold to thereby estimate the estrus on the basis of an activity amount, it may be difficult to accurately detect a state by using a single threshold therefor. For example, in a case where the threshold is set on the basis of an average activity amount within a cattleshed, livestock animals which are not actually in estrus may be erroneously determined as those being in estrus if the activity amount of the entire group of livestock animals increases due to grazing. In contrast, even in a case where the threshold is set on the basis of the average activity amount in grazing, it is also difficult to accurately determine the estrus.

In view of this, by estimating a scene (situation) where the livestock animals are placed, a suitable algorithm can be used on the basis of the estimated scene.

Figure 17:
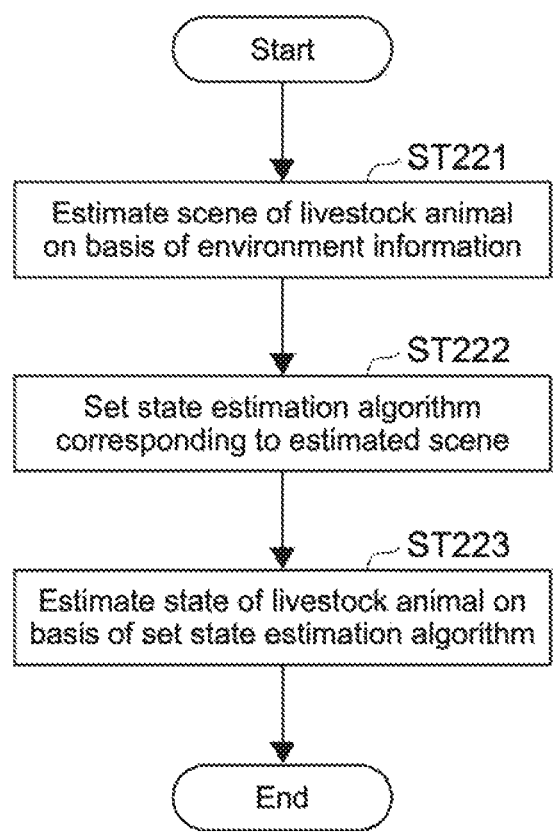
FIG. 17 A flowchart showing a flow of processing of setting a state estimation algorithm on the basis of an estimation situation according to Modified Example 1-5.

FIG. 17 is a flowchart showing a flow of processing the algorithm is set on the basis of a estimated scene according to Modified Example 1-5. The processing shown in the figure may show detailed processing of the step of "estimating a state of the livestock animal on the basis of the algorithm for estimating the state of the livestock animal from the power generation information", which is shown in ST22 of FIG. 8.

First of all, the CPU 31 estimates the scene (situation) where a target livestock animal is placed on the basis of the environment information (ST221). Estimation of the scene may be performed for each livestock animal to which each sensor apparatus 1 is attached, for example. Alternatively, estimation of the scene may be performed on a herd (group)-by-herd (group) basis set automatically or manually.

Various types of information can be used as the environment information used for estimation of the scene.

For example, the power generation information of the sensor apparatus 1 can be used as the environment information. Specifically, it is possible to estimate a staying place from the power generation information by the method described above with reference to FIGS. 7A, 7B, 7C, and 7D and estimate whether or not the livestock animal is grazing or staying in the barn. Further, it is possible to estimate a grazing time on the basis of the differential value of the power generation amount of the solar power generation unit 11a and estimate whether or not the livestock animal is grazing. Note that, if the plurality of livestock animals behaves in a herd, when it is determined that livestock animals of this herd at a rate equal to or larger than a predetermined value (e.g., 80% or more) are grazing, the CPU 31 may estimate that all the livestock animals belonging to this herd are in the same scene.

Alternatively, the position information can be used as the environment information. Specifically, the processing can be performed in the following manner. That is, the communication apparatus 2 transmits power generation information sent from the sensor apparatus 1 and identification information for identifying the communication apparatus 2 to the server apparatus 3. The storage unit 32 of the server apparatus 3 stores, in advance, position information of the communication apparatus 2 corresponding to each identification information and scene information corresponding to each communication apparatus 2. The CPU 31 checks the sent power generation information and the identification information of the communication apparatus 2 against the stored information and estimates that the scene information corresponding to the communication apparatus 2 that has received the power generation information from the sensor apparatus 1 is a scene in which this sensor apparatus 1 is placed. For example, if the storage unit 32 stores information on "latitude/longitude (aa, bb) of a communication apparatus X, place: milking parlor", the CPU 31 is capable of estimating that the scene in which the livestock animal corresponding to the sensor apparatus 1 that has communicated with the communication apparatus X is placed is "milking". Alternatively, the position information can also be acquired by using the method described above in Modified Example 1-3.

Further, the information regarding an external environment determined by using the secondary information described in this modified example can be used as the environment information. For example, by using temperature information, weather information, or the like of the pasture determined as the external environment, the CPU 31 is also capable of determining that the scene in which the livestock animal is placed is "intense heat" on the basis of this information.

In addition, the CPU 31 may estimate the scene on the basis of environment information combining a plurality of pieces of environment information described above and other information.

Note that estimation of the scene may be performed every time the power generation information is received, or the environment information may be generated at arbitrary time intervals and then the processing may be performed.

Subsequently, the CPU 31 sets a state estimation algorithm for estimating a state of the livestock animal corresponding to the estimated scene (ST222).

For example, if the estimated scene is "grazing", the CPU 31 is capable of setting a state estimation algorithm corresponding to grazing. Alternatively, if the estimated scene is "being in a barn", the CPU 31 is capable of setting a state estimation algorithm corresponding to being in a barn. These state estimation algorithms may be each generated by machine learning or may be generated from statistical data. Further, a plurality of algorithms to be set may be, for example, those obtained by changing some elements such as a threshold.

Further, the state estimation algorithm to be set may include an algorithm having contents of "stopping further estimation of the state". For example, regarding the livestock animal whose estimated scene is "milking", it is possible to prevent an erroneous state from being estimated by "stopping further estimation of the state". Further, in this case, the estimated scene (e.g., "milking") can be considered as the state of the livestock animal.

Lastly, the CPU 31 estimates a state of the livestock animal on the basis of the set state estimation algorithm (ST223).

With this, suitable estimation of the state can be performed in different scenes and the accuracy of the state estimation can be enhanced.

(Modified Example 1-6: Modified Example of Management Apparatus)

The management apparatus 3 may be, for example, an information processing apparatus connectable to the network N.

In this case, for example, the management apparatus 3 may be a PC, a smartphone, a tablet terminal, or the like used by a livestock raiser (user).

Figure 18:
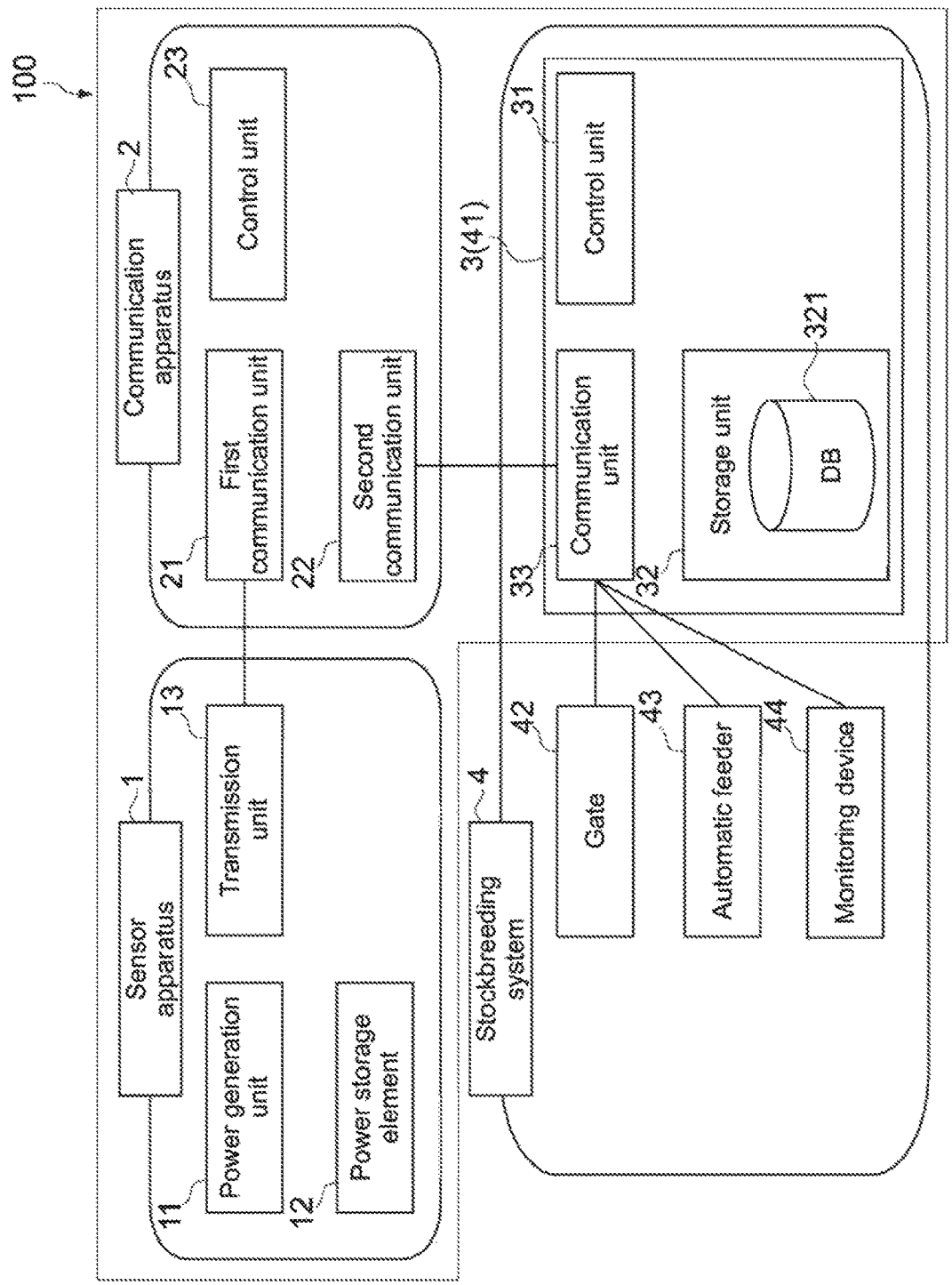
FIG. 18 A block diagram showing a configuration of the livestock management system according to Modified Example 1-6.

Alternatively, as shown in FIG. 18, the management apparatus 3 may be realized by the master monitor apparatus 41 of the stockbreeding system 4. The communication unit 33 of the management apparatus 3 (master monitor apparatus 41) is connected to each configuration of the stockbreeding system 4 in a wired or wireless manner.

Also with such a configuration, the livestock management system 100 can be realized.

(Modified Example 1-7: Modified Example of Communication Apparatus)

The communication apparatus 2 may be at least one sensor apparatus 1 (hereinafter, referred to as a master sensor apparatus 2) of the plurality of sensor apparatuses 1. The master sensor apparatus 2 may be a particular sensor apparatus of the plurality of sensor apparatuses 1 or may be variable in a manner that depends on group organization.

Figure 19:
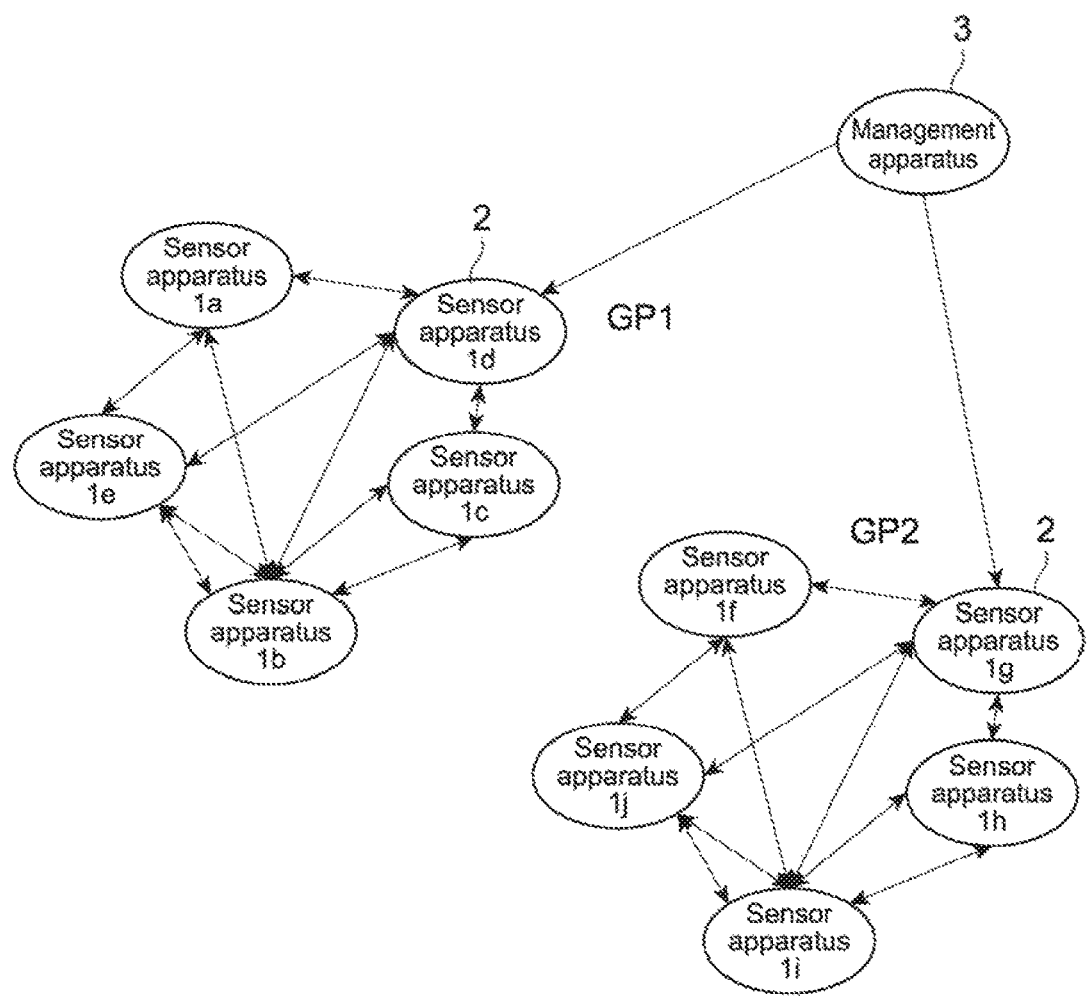
FIG. 19 A schematic diagram showing a conception of Modified Example 1-7.

FIG. 19 is a schematic diagram showing a conception of this modified example.

As shown in the figure, the livestock management system 100 includes ten sensor apparatuses 1a to 1j and a management apparatus 3. For example, the sensor apparatuses 1a to 1e constitute a first group GP1 and the sensor apparatuses 1f to 1j constitute a second group GP2.

The groups GP1 and GP2b formed of the sensor apparatuses 1 are configured in such a manner that each of the sensor apparatuses 1 connects to another sensor apparatus 1 present in a communicable range in a point-to-point manner, for example. For example, the sensor apparatuses 1a to 1e belonging to the group GP1 forms a mesh network, and the sensor apparatuses 1a to 1e each correspond to a node, connected in a point-to-point manner, and capable of sharing their power generation information and the like.

Similarly, the sensor apparatuses 1f to 1j belonging to the group GP2 form a mesh network and the sensor apparatuses 1f to 1j each correspond to a node, connected in a point-to-point manner, and capable of sharing their power generation information and the like.

Note that the configurations of the above-mentioned groups can change when the sensor apparatuses 1 and livestock animals to which the sensor apparatuses 1 are attached move.

In the example shown in the figure, the sensor apparatus 1d and the sensor apparatus 1g function as master sensor apparatuses 2 and are configured to be capable of communicating with the management apparatus 3. These master sensor apparatuses 2 are capable of transmitting power generation information of the respective sensor apparatuses 1 belonging to each of the groups GP1 and GP2, to the management apparatus 3.

Each of the transmission units 13 of the master sensor apparatuses 2 includes a communication circuit connectable to the management apparatus 3 besides a communication circuit that enables communication between the sensor apparatuses 1 to be performed.

A configuration of this communication circuit appropriately depends on a communication method with the management apparatus 3. For example, if the management apparatus 3 is connected to the network N, the communication circuit is configured to be connectable to the network N by using a wireless LAN (IEEE802.11, etc.) such as WiFi (Wireless Fidelity) or a 3G or 4G network for mobile communication.

In addition, each sensor apparatus 1 belonging to each of the groups GP1 and GP2 is capable of acquiring information on the strength of a signal sent from another sensor apparatus 1 connected thereto. With this, the sensor apparatus 1d and the sensor apparatus 1g are capable of transmitting the information on the signal strength between their sensor apparatuses 1 while associating it with the power generation information. Therefore, as in Modified Example 1-3, the CPU 31 is capable of acquiring information regarding a distance from each sensor apparatus 1.

In accordance with this modified example, the system configuration can be simplified. In addition, the CPU 31 is capable of acquiring the information regarding the distance from each sensor apparatus 1 and accurately estimating the position of each sensor apparatus 1.

(Modified Example 1-7: Output Adjustment (Calibration) of Sensor Apparatus)

The management apparatus 3 is capable of adjusting power generation information acquired from the sensor apparatus 1. The "adjustment" set forth herein may be, for example, calibration. For example, the management apparatus 3 calibrates the output of one sensor apparatus 1 on the basis of a statistical value of the power generation information from the plurality of sensor apparatuses 1 or may statistically process chronological power generation information from one sensor apparatus 1 to thereby adjust the output of that sensor apparatus 1.

In the respective power generation units of the sensor apparatuses 1, there are considerable individual differences in output characteristics at the manufacturing stage or considerable individual differences due to changes over years which are caused by usage. Regarding this individual difference, data on an identical individual may be continuously acquired, a relative amount change thereof may be handled as information, and thus the individual difference may be cancelled. Alternatively, for example, respective livestock animals may be exposed to the same environment and calibration may be performed on the basis of a difference in power generation amount under the same environment. That is, for example, the livestock animals are exposed to an area of the same light source, an area of the same vibration, an area of the same radio field intensity, and an area of the same temperature. Calibration may be performed by making the output of the respective power generation units at this time uniform. Further, by setting normality/abnormality thresholds with respect to the output of the power generation unit at this time in advance, an abnormality of the sensor apparatus or an abnormality of the power generation unit may be detected and used as maintenance information. Note that the area of the same environment may be, for example, set on a path through which the livestock animals pass or may be a space that is not the path. In addition, a uniform environment space may be formed by controlling a temperature/humidity/illuminance controller of a space in which the livestock animals normally stay. A dedicated space may be used for forming a more stable environment space.

Output adjustment (calibration) of the sensor apparatus 1 by the management apparatus 3 may be performed simultaneously with the estimation processing of the state of the livestock animal or may be performed separately from the estimation processing. If such output adjustment is performed separately from the estimation processing, the management apparatus 3 is capable of performing output adjustment at a timing depending on user's input operation, for example.

(Other Modified Examples)

For example, the livestock management system 100 may be a configuration in which it does not include the plurality of sensor apparatuses 1 and includes only one sensor apparatus. With this, the CPU 31 is capable of estimating a state of the livestock animal attached to this sensor apparatus 1.

Further, the management apparatus 3 is not limited to the example in which it is constituted by one information processing apparatus, and may be constituted by a plurality of information processing apparatuses.

<Second Embodiment>
[Configuration of Livestock Management System]

Figure 20:
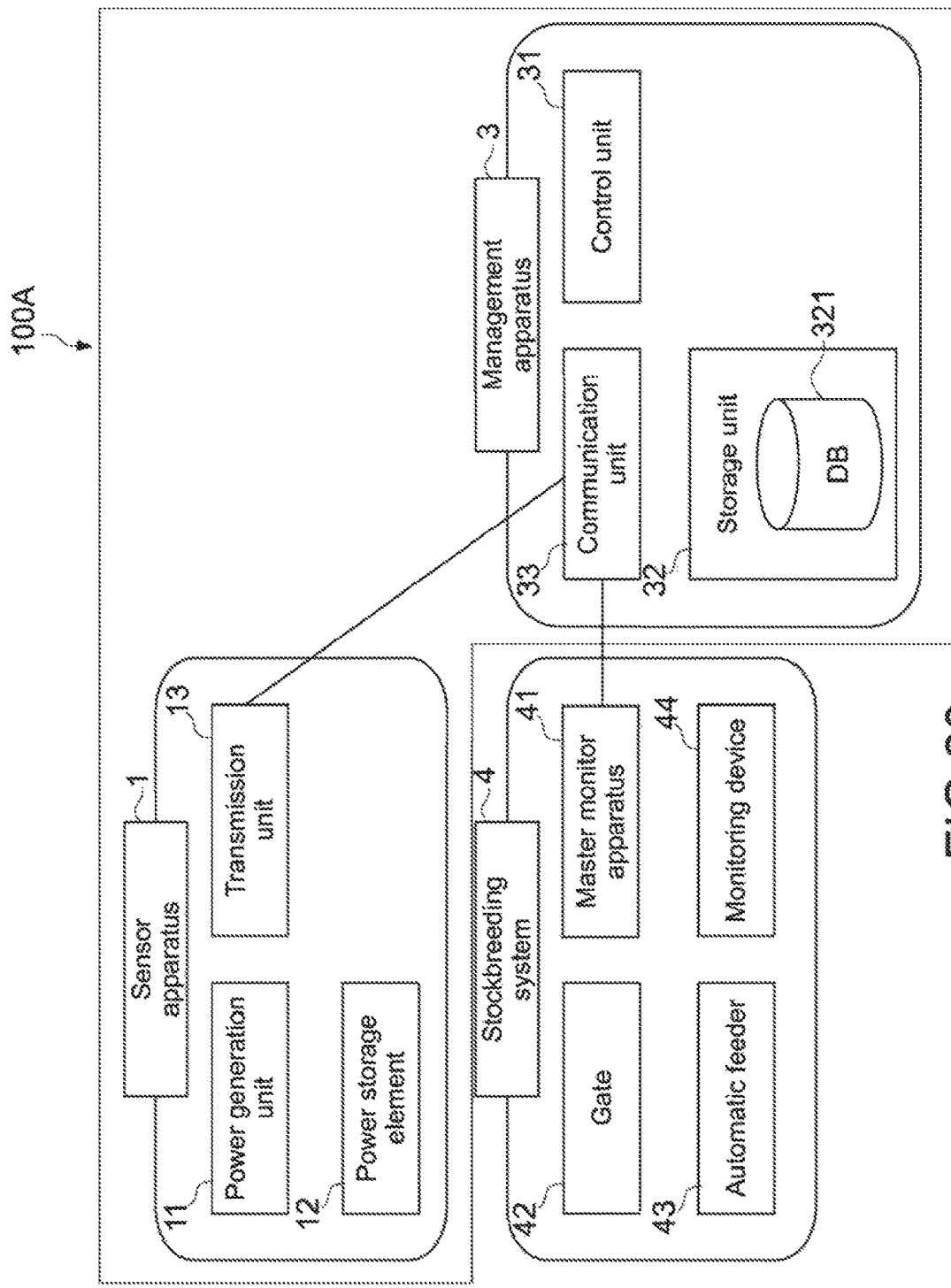
FIG. 20 A block diagram showing a configuration of a livestock management system according to a second embodiment.

FIG. 20 is a block diagram showing a configuration of a livestock management system 100A according to a second embodiment of the present technology. Hereinafter, configurations similar to those of the above-mentioned embodiment will be denoted by identical signs and descriptions thereof will be omitted.

As shown in FIG. 20, the livestock management system 100A includes a sensor apparatus 1 and a management apparatus 3 and does not include a communication apparatus 2. That is, a transmission unit 13 of the sensor apparatus 1 at least includes a communication circuit for directly communicating with the management apparatus 3.

A configuration of the communication circuit appropriately depends on a communication method with the management apparatus 3.

For example, if the management apparatus 3 is configured as a server apparatus over a network N, the communication circuit is configured to be connectable to the network N by using a wireless LAN (IEEE802.11, etc.) such as WiFi (Wireless Fidelity) or a 3G or 4G network for mobile communication.

Alternatively, if the management apparatus 3 is configured as an information processing apparatus arranged in a gate 42 or a barn, the communication circuit can be connected to the management apparatus 3 by using a short-distance wireless communication or the like such as "Wi-Fi (registered trademark)", "ZigBee (registered trademark)", "Bluetooth (registered trademark)", "Bluetooth Low Energy", "ANT (registered trademark)", "ANT+ (registered trademark)", and "EnOcean (registered trademark)".

Further, the management apparatus 3 may be realized by a master monitor apparatus 41 of a stockbreeding system 4 as described above in Modified Example 1-6.

Also with such a configuration, the livestock management system 100A can be realized.

Figure 21:
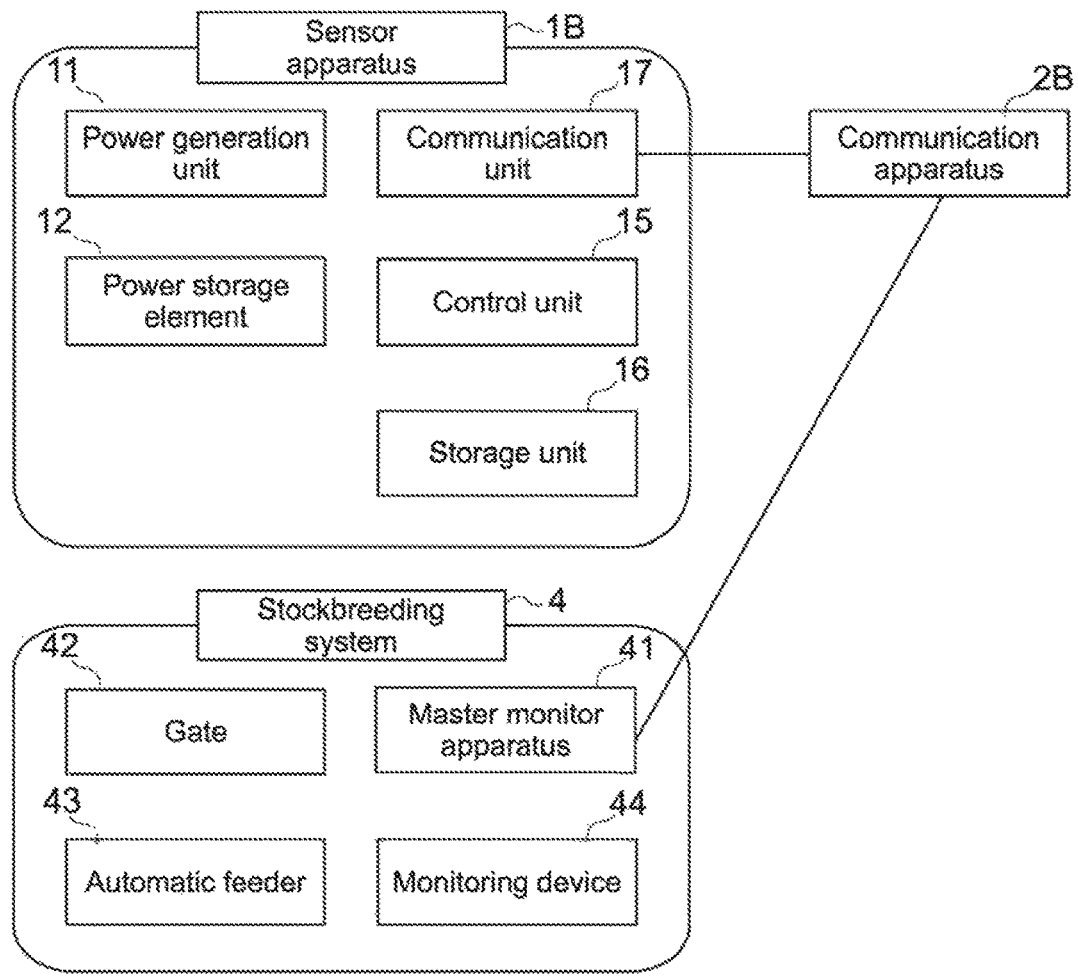
FIG. 21 A block diagram showing a configuration of a livestock management system according to a third embodiment.

<Third Embodiment>
[Configuration of Sensor Apparatus]
FIG. 21 is a block diagram showing a configuration of a sensor apparatus 1B according to a third embodiment of the present technology. Hereinafter, configurations similar to those of the above-mentioned embodiments will be denoted by identical signs and descriptions thereof will be omitted.

The sensor apparatus 1B according to this embodiment is configured to be capable of estimating a state of a livestock animal.

That is, as shown in FIG. 21, the sensor apparatus 1B includes a power generation unit 11, a power storage element 12, and a casing 14. The sensor apparatus 1B further includes a CPU (control unit) 15, a storage unit 16, and a transmission unit 17.

Note that, as in the sensor apparatus 1, the sensor apparatus 1B may include a plurality of modules. Although the respective modules basically have the configurations described above with reference to FIG. 5 and the like, a communication circuit 109 may be omitted.

The method described in the above-mentioned first embodiment can be applied to the estimation method according to this embodiment.

The casing 14 is configured to be attachable to the livestock animal as shown in FIG. 3. Further, the casing 14 may have a gas-tight structure.

The power generation unit 11 is accommodated in the casing 14 and generates electric power in a manner that depends on a surrounding environment.

The CPU 15 configured to be capable of estimating the state of the livestock animal on the basis of the power generation information. Referring to FIG. 5, the CPU 15 may be connected to each of MPUs 107 of the plurality of modules of the sensor apparatus 1B. Alternatively, each module does not include the MPU 107 and the CPU 15 may be connected to each of reset ICs 106. With this, the CPU 15 is capable of acquiring information on the presence/absence of generation of electric power equivalent to a predetermined amount in each module and frequency of power generation.

The state of the livestock animal can be estimated by the CPU 15 in the following manner. That is, as in the CPU 31, the CPU 15 is capable of estimating, from the acquired power generation information, a state of the livestock animal on the basis of an algorithm, which is generated by machine learning using sample power generation information and sample actual data and is capable of estimating a state of the livestock animal on the basis of the power generation information. Alternatively, as described above as Modified Example 1-5, the CPU 15 may estimate a state of the livestock animal on the basis of a predetermined algorithm for analyzing the state of the livestock animal from the power generation information.

Further, the various states described above in the first embodiment can also be applied to the state to be estimated.

In addition, the CPU 15 is capable of generating a control signal capable of controlling the external apparatus. In the example shown in FIG. 21, the external apparatus can be the master monitor apparatus 41 of the stockbreeding system 4.

The storage unit 16 includes, for example, a ROM in which programs to be executed by the CPU 15 are stored and a RAM to be used as a work memory or the like when the CPU 31 executes processing. In addition, the storage unit 16 may include an HDD (Hard Disk Drive) and a nonvolatile memory such as a flash memory (SSD; Solid State Drive).

The transmission unit 17 is configured as a communication circuit capable of transmitting the generated control signal.

In the example shown in FIG. 21, the transmission unit 17 is connected to a communication apparatus 2B having a configuration similar to that of the above-mentioned communication apparatus 2. In this case, the transmission unit 17 may be configured such that short-distance wireless communication such as "Wi-Fi (registered trademark)", "ZigBee (registered trademark)", "Bluetooth (registered trademark)", "Bluetooth Low Energy", "ANT (registered trademark)", "ANT+ (registered trademark)", and "EnOcean (registered trademark)" is possible.

The communication apparatus 2B is configured to be capable of communicating with the transmission unit 17. In addition, the communication apparatus 2B is connected to the master monitor apparatus 41 of the stockbreeding system 4 via the Internet or the like. With this, the master monitor apparatus 41 can be controlled in the above-mentioned manner on the basis of the control signal generated by the CPU 15.

Further, the master monitor apparatus 41 is capable of analyzing the plurality of states of the livestock animals to which the sensor apparatus 1B is attached on the basis of the control signal sent from the individual sensor apparatus 1B. For example, the master monitor apparatus 41 is also capable of calculating statistical values with respect to the plurality of states of the livestock animals and extracting an abnormal individual in the group of livestock animals to which the sensor apparatuses 1B are attached.

With this, processing load of the sensor apparatus 1B can be reduced and the sensor apparatus 1B can be downsized.

In accordance with this embodiment, the management apparatus becomes unnecessary, and the configuration of the entire system can be downsized.

[Modified Example]
The configuration of the sensor apparatus 1B can employ various configurations as in the sensor apparatus 1.

For example, a configuration without the power storage element 12 may be employed or a configuration including the RTC may be employed as shown in FIG. 14.

In addition, as described above in Modified Example 1-4, the sensor apparatus 1B may include the switch in which the conduction state can be provided by switching the contact, for example, or may include the force storage element.

Further, the sensor apparatus 1B may be configured to be connected to the Internet without passing through the communication apparatus 2B. In this case, the transmission unit 17 may be configured to be connectable to the Internet in a wired or wireless manner, for example.

Alternatively, the transmission unit 17 may be an interface connectable to the external apparatus or may be, for example, configured as a connector such as a USB terminal. With this, for example, the control signal can be transmitted in such a manner that the sensor apparatus 1B is connected to the master monitor apparatus 41.

Although the embodiments of the present technology have been described above, it is needless to say that the present technology is not limited only to the above-mentioned embodiments and various modifications can be made without departing from the gist of the present technology.

For example, the livestock management system 100 may have a configuration including only the management apparatus 3.

It should be noted that the present technology may also take the following configurations.

(1) A livestock management system, including:
    a sensor apparatus including
        a power generation unit that generates electric power in a manner that depends on a surrounding environment, and
        a transmission unit that transmits power generation information of the power generation unit with electric power obtained by the power generation unit, the sensor apparatus being attachable to a livestock animal; and
    a management apparatus including
        a reception unit that receives the power generation information from the sensor apparatus, and
        a control unit that estimates a state of the livestock animal on the basis of the power generation information.

(2) The livestock management system according to (1), in which
    the reception unit receives the power generation information from each of a plurality of sensor apparatuses including each of the power generation unit and the transmission unit and respectively attachable to a plurality of livestock animals.

(3) The livestock management system according to (2), in which
    the control unit generates relative indication data about the plurality of livestock animals to which the plurality of sensor apparatuses are respectively attached, by using a plurality of pieces of power generation information transmitted by the plurality of sensor apparatuses, and compares the relative indication data with a piece of power generation information of the plurality of pieces of power generation information to thereby estimate the state of the livestock animal that corresponds to the piece of power generation information.

(4) The livestock management system according to any one of (1) to (3), further including
    the sensor apparatus including
        the power generation unit that generates electric power in a manner that depends on a surrounding environment, and
        the transmission unit that transmits the power generation information of the power generation unit, the sensor apparatus being attachable to the livestock animal.

(5) The livestock management system according to (4), in which
    the transmission unit is configured to be, in a manner that depends on electric power supplied from the power generation unit, switchable between a stand-by state and a transmission state in which the transmission unit is enabled to transmit the power generation information, and transmits an identifier allocated to the power generation unit as the power generation information in the transmission state.

(6) The livestock management system according to (5), in which
    the control unit estimates the state of the livestock animal on the basis of reception frequency of the power generation information including the identifier transmitted by the sensor apparatus.

(7) The livestock management system according to any one of (4) to (6), in which
    the power generation unit performs power generation with energy based on at least any one of light, heat, vibration, radio waves including a far electromagnetic field and a near electromagnetic field, and particular organic and inorganic matters.

(8) The livestock management system according to any one of (1) to (7), in which
    the control unit estimates, on the basis of the power generation information, at least one of staying place, activity amount, behavior, and presence/absence of fever of the livestock animal and presence/absence of particular organic and inorganic matters.

(9) The livestock management system according to any one of (1) to (8), in which
    the control unit estimates whether or not the livestock animal is in estrus on the basis of the power generation information.

(10) The livestock management system according to any one of (1) to (9), in which
    the control unit estimates meat quality of the livestock animal on the basis of the power generation information.

(11) The livestock management system according to any one of (1) to (10), in which
    the control unit generates a control signal on the basis of the estimated state of the livestock animal, the control signal capable of controlling an external apparatus.

(12) The livestock management system according to any one of (1) to (11), in which
    the management apparatus further includes
        a storage unit that stores
            sample power generation information acquired from the sensor apparatus attached to a livestock animal sample, and
            sample actual data indicating an actual state of the sample livestock animal, and
    the control unit estimates the state of the livestock animal on the basis of an algorithm capable of estimating the state of the livestock animal on the basis of the power generation information, the algorithm being generated by machine learning using the sample power generation information and the sample actual data as learning data.

(13) The livestock management system according to (12), in which
    the control unit
    estimates a state of a first livestock animal on the basis of the algorithm and power generation information acquired from a first sensor apparatus including each of the power generation unit and the transmission unit and attached to the first livestock animal,
    causes the storage unit to store first actual data indicating an actual state of the first livestock animal, determines whether or not estimation accuracy of the algorithm satisfies a first condition, on the basis of an assessment result of the estimated state of the first livestock animal with respect to the first actual data, corrects the algorithm on the basis of the assessment result if it is determined that the estimation accuracy of the algorithm does not satisfy the first condition, and estimates a state of a second livestock animal on the basis of the corrected algorithm and power generation information acquired from a second sensor apparatus including each of the power generation unit and the transmission unit and attached to the second livestock animal.

(14) The livestock management system according to (13), in which the control unit determines, after estimating the state of the second livestock animal, whether or not a second condition regarding a correction period of the algorithm is satisfied, and causes, if it is determined that the second condition is satisfied, the storage unit to store second actual data indicating an actual state of the second livestock animal and determines whether or not the estimation accuracy of the algorithm satisfies the first condition, on the basis of an assessment result of the estimated state of the second livestock animal with respect to the second actual data.

(15) The livestock management system according to any one of (1) to (14), in which the control unit sets, on the basis of environment information indicating a surrounding environment of the livestock animal, a state estimation algorithm corresponding to a situation in which the livestock animal is placed, and estimates the state of the livestock animal in accordance with the set state estimation algorithm.

(16) The livestock management system according to any one of (2) to (6), in which the sensor apparatus further includes a power storage element that stores electric power generated by the power generation unit, and a casing that accommodates the power generation unit including a solar power generator and a vibration power generator, the transmission unit that transmits the power generation information via wireless communication, and the power storage element, and is configured to be attachable to a body of the livestock animal, and the casing does not include a lid for replacement of the power storage element and at least a part of the casing is formed of a light-transmissive material.

(17) The livestock management system according to (16), in which the power storage element is constituted by a capacitor.

(18) The livestock management system according to any one of (1) to (17), further including a communication apparatus that is capable of communicating with each of the transmission unit and the reception unit and transmits the power generation information transmitted from the transmission unit, to the reception unit.

(19) A sensor apparatus, including:

a casing attachable to a livestock animal;

a power generation unit that is accommodated in the casing and generates electric power in a manner that depends on a surrounding environment; and a control unit that is accommodated in the casing and estimates a state of the livestock animal on the basis of the power generation information.

(20) An estimation method for a state of a livestock animal, the method including:

acquiring, by a control unit of an information processing apparatus, power generation information of a power generation unit that generates electric power in a manner that depends on a surrounding environment; and estimating the state of the livestock animal on the basis of the power generation information.

REFERENCE SIGNS LIST 1, 1B . . . sensor apparatus
11 . . . power generation unit
13 . . . transmission unit
2 . . . communication apparatus
3 . . . management apparatus
31 . . . communication unit (reception unit)
32 . . . storage unit
33 . . . CPU (control unit)
100, 100A . . . livestock management system

The invention claimed is:

1. A livestock management system, comprising:
a sensor apparatus attachable to a livestock animal,
wherein the sensor apparatus comprises:
a power generation unit configured to generate electric power based on a surrounding environment of the livestock animal; and
a transmission unit configured to:
transmit power generation information of the power generation unit with the electric power generated by the power generation unit; and
switch between a stand-by state and a transmission state based on the electric power supplied from the power generation unit,
wherein in the transmission state, the transmission unit is further configured to transmit an identifier allocated to the sensor apparatus as the power generation information; and
a management apparatus comprising:
a reception unit configured to receive the power generation information from the sensor apparatus; and
a control unit configured to estimate a state of the livestock animal based on the power generation information.

2. The livestock management system according to claim 1, further comprising
a plurality of sensor apparatuses attachable to a plurality of livestock animals,
wherein each sensor apparatus of the plurality of sensor apparatuses comprises:
the power generation unit; and
the transmission unit,
wherein the reception unit is further configured to receive the power generation information from each sensor apparatus of the plurality of sensor apparatuses.

3. The livestock management system according to claim 2,
wherein the control unit is further configured to:
generate relative indication data about the plurality of livestock animals to which the plurality of sensor apparatuses are respectively attached, wherein the relative indication data is generated based on a plurality of pieces of the power generation information transmitted by the plurality of sensor apparatuses;

compare the relative indication data with a piece of the power generation information of the plurality of pieces of the power generation information; and estimate the state of the livestock animal that corresponds to the piece of the power generation information.

4. The livestock management system according to claim 1, wherein the control unit is further configured to estimate the state of the livestock animal based on a reception frequency of the power generation information, and wherein the power generation information includes the identifier transmitted by the sensor apparatus.

5. The livestock management system according to claim 1, wherein the power generation unit is further configured to generate the electric power with energy based on at least one of light, heat, vibration, radio waves including a far electromagnetic field and a near electromagnetic field, or particular organic and inorganic matters.

6. The livestock management system according to claim 1, wherein the control unit is further configured to estimate at least one of a staying place, an activity amount, a behavior, and presence/absence of fever of the livestock animal or presence/absence of particular organic and inorganic matters, based on the power generation information.

7. The livestock management system according to claim 1, wherein the control unit is further configured to estimate that the livestock animal is in estrus based on the power generation information.

8. The livestock management system according to claim 1, wherein the control unit is further configured to estimate meat quality of the livestock animal based on the power generation information.

9. The livestock management system according to claim 1, wherein the control unit is further configured to generate a control signal based on the estimated state of the livestock animal, and the control signal is configured to control an external apparatus.

10. The livestock management system according to claim 1, wherein the management apparatus further includes a storage unit configured to store
sample power generation information acquired from the sensor apparatus attached to a livestock animal sample, and
sample actual data indicating an actual state of the sample livestock animal, wherein the control unit is further configured to estimate the state of the livestock animal based on an algorithm, wherein the algorithm is configured to estimate the state of the livestock animal based on the power generation information, and wherein the algorithm is generated based on machine learning using the sample power generation information and the sample actual data as learning data.

11. The livestock management system according to claim 10, wherein the control unit is further configured to:

estimate a state of a first livestock animal based on the algorithm and first power generation information acquired from a first sensor apparatus attachable to the first livestock animal;

store first actual data indicating an actual state of the first livestock animal in the storage unit;

determine satisfaction of a first condition by estimation accuracy of the algorithm based on an assessment result of the estimated state of the first livestock animal with respect to the first actual data;

based on a determination that the first condition is unsatisfied by the estimation accuracy of the algorithm, correct the algorithm based on the assessment result; and estimate a state of a second livestock animal based on the corrected algorithm and second power generation information acquired from a second sensor apparatus attached to the second livestock animal.

12. The livestock management system according to claim 11, wherein the control unit is further configured to:

determine, after estimation of the state of the second livestock animal, satisfaction of a second condition regarding a correction period of the algorithm;

store, based on the determination that the second condition is satisfied, second actual data indicating an actual state of the second livestock animal in the storage unit; and determine satisfaction of the first condition by the estimation accuracy of the algorithm based on an assessment result of the estimated state of the second livestock animal with respect to the second actual data.

13. The livestock management system according to claim 1, wherein the control unit is further configured to:

set, based on environment information indicating the surrounding environment of the livestock animal, a state estimation algorithm corresponding to a situation in which the livestock animal is placed; and estimate the state of the livestock animal based on the set state estimation algorithm.

14. The livestock management system according to claim 1, wherein the sensor apparatus further includes:

a power storage element configured to store the electric power generated by the power generation unit; and a casing configured to accommodate the power generation unit, wherein the casing has a gas-tight structure that prevents an external gas and an external liquid from entering the casing and at least a part of the casing is formed of a light-transmissive material, wherein the power generation unit comprises:
a solar power generator; and
a vibration power generator, and wherein the transmission unit is further configured to transmit the power generation information via wireless communication.

15. The livestock management system according to claim 14, wherein the power storage element is constituted by a capacitor.

16. The livestock management system according to claim 1, further comprising a communication apparatus configured to:
communicate with each of the transmission unit and the reception unit; and
transmit the power generation information transmitted from the transmission unit to the reception unit.

17. A sensor apparatus, comprising:
a casing attachable to a livestock animal;

a power generation unit accommodated in the casing,
wherein the power generation unit is configured to generate electric power based on a surrounding environment of the livestock animal;
a transmission unit configured to:
- transmit power generation information of the power generation unit with the electric power generated by the power generation unit; and
- switch between a stand-by state and a transmission state based on the electric power supplied from the power generation unit,
- wherein in the transmission state, the transmission unit is further configured to transmit an identifier allocated to the sensor apparatus as the power generation information; and a control unit accommodated in the casing,
- wherein the control unit is configured to estimate a state of the livestock animal based on the power generation information.

18. An estimation method for a state of a livestock animal, the method comprising:
- generating, by a power generation unit of a sensor apparatus attached to the livestock animal, electric power based on a surrounding environment of the livestock animal;
- transmitting, by a transmission unit of the sensor apparatus, power generation information of the power generation unit with the generated electric power;
- switching, by the transmission unit, between a stand-by state and a transmission state based on the electric power;
- transmitting, by the transmission unit in the transmission state, an identifier allocated to the sensor apparatus as the power generation information; and
- estimating, by a control unit of the sensor apparatus, the state of the livestock animal based on the power generation information.

* * * * *